(12) United States Patent
Iljima et al.

(10) Patent No.: US 9,160,243 B2
(45) Date of Patent: Oct. 13, 2015

(54) CONTROL CIRCUIT AND INTERLEAVED POWER SUPPLY INCLUDING THAT CONTROL CIRCUIT

(71) Applicant: SHINDENGEN ELECTRIC MANUFACTURING CO., LTD., Tokyo (JP)

(72) Inventors: Shinya Iljima, Saitama (JP); Hideyuki Ono, Saitama (JP); Kenichi Kubota, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 80 days.

(21) Appl. No.: 14/005,271

(22) PCT Filed: Sep. 28, 2012

(86) PCT No.: PCT/JP2012/075205
§ 371 (c)(1),
(2) Date: Sep. 15, 2013

(87) PCT Pub. No.: WO2013/073298
PCT Pub. Date: May 23, 2013

(65) Prior Publication Data
US 2014/0056037 A1 Feb. 27, 2014

(30) Foreign Application Priority Data
Nov. 18, 2011 (JP) .................................. 2011-252579

(51) Int. Cl.
*H02M 3/335* (2006.01)
*H02M 3/158* (2006.01)
*H02M 1/00* (2007.01)

(52) U.S. Cl.
CPC ........ *H02M 3/33576* (2013.01); *H02M 3/1584* (2013.01); *H02M 2001/0003* (2013.01); *H02M 2003/1586* (2013.01)

(58) Field of Classification Search
CPC ................... H02M 2003/1586; H02M 3/1584; H02M 3/158; H02M 1/15; H02M 1/088
See application file for complete search history.

(56) References Cited

U.S. PATENT DOCUMENTS

| 6,144,194 | A  | * | 11/2000 | Varga ............................. 323/285 |
| 6,495,995 | B2 |   | 12/2002 | Groom et al. |
| 6,977,489 | B2 |   | 12/2005 | Isham |
| 7,107,468 | B2 | * | 9/2006 | Pullen et al. ................... 713/300 |
| 7,348,948 | B2 | * | 3/2008 | Crawford et al. ............... 345/82 |

FOREIGN PATENT DOCUMENTS

JP 2009-261229 A 11/2009
WO 2011/122172 A1 10/2011

OTHER PUBLICATIONS

Korean Intellectual Property Office (KIPO), Notice of Allowance for Korean Patent Application No. 10-2013-7025021, Jul. 31, 2014.
International Search Report for PCT/JP2012/075205, Nov. 13, 2012.

* cited by examiner

*Primary Examiner* — Timothy J Dole
*Assistant Examiner* — Alan Stewart

(57) ABSTRACT

In a control circuit that controls an interleaved power supply, a clock generator generates a clock pulse having a predetermined frequency. A signal doubler generates a master switch on-interval pulse signal indicating information concerning an on-interval of the master switch based on the clock pulse and a master drive pulse signal that drives the master switch, and generates a doubled duty pulse signal having a duty that is double that of the master switch on-interval pulse signal. An edge pulse generator generates a first edge pulse signal based on the master drive pulse signal, and generates a second edge pulse signal based on the doubled duty pulse signal. A slave drive pulse signal generator generates, based on the first and second edge pulse signals, a slave drive pulse signal that drives the slave switch so that an on-interval of the slave switch is identical to that of the master switch.

8 Claims, 11 Drawing Sheets

CONTROL CIRCUIT AND INTERLEAVED POWER SUPPLY INCLUDING THAT CONTROL CIRCUIT

TECHNICAL FIELD

The present invention relates to a control circuit that controls an interleaved power supply, and an interleaved power supply including that control circuit, which are unlikely to be affected by a variation among components and are suitable for mass production.

Priority is claimed on Japanese Patent Application No. 2011-252579, filed Nov. 18, 2011, the content of which is incorporated herein by reference.

BACKGROUND ART

One of interleaved switching-mode power supplies of related art is disclosed in FIG. 1 of Patent Document 1. Regarding the interleaved switching-mode power supply of the related art, for example, each of two critical-mode boost-chopper converters includes a control circuit that controls on/off of a switch element provided between the other terminal of a transformer and a ground. The control circuit of the first critical-mode boost-chopper converter generates an on-timing of the switch element of the first critical-mode boost-chopper converter based on the voltage of a control coil of the first critical-mode boost-chopper converter. The control circuit of the second critical-mode boost-chopper converter generates an on-timing of the switch element of the second critical-mode boost-chopper converter at the timing at which the switch element of the first critical-mode boost-chopper converter turns off.

The interleaved switching-mode power supply disclosed in FIG. 1 of Patent Document 1 has the configuration such that FB terminals of the two critical-mode boost-chopper converters are commonly coupled and GND terminals thereof are commonly coupled, thereby achieving the interleaved switching-mode power supply that can be controlled by the extremely simple configuration.

In such the system having the above configuration that the FB terminals of the two critical-mode boost-chopper converters are commonly coupled and GND terminals thereof are commonly coupled, it is necessary to use the control circuits for the first and second critical-mode boost-chopper converters that have substantially approximate relationships between the voltage of the FB terminal (VFB) and the on-interval of the switch element Q31 (TON) as shown in FIG. 4 of Patent Document 1.

CITATION LIST

Patent Document

[Patent Document 1] Japanese Patent Unexamined Application, First Publication No. 2009-261229

DISCLOSURE OF INVENTION

Problems to be Solved by the Invention

However, if control circuits not having approximate relationships between the voltage of the FB terminal (VFB) and the on-interval of the switch element Q31 (TON) are used, the on-intervals of the first and second critical-mode boost-chopper converters are unbalanced. Consequently, critical current operation of the second critical-mode boost-chopper converter cannot be maintained, thereby making it likely to cause a decrease in power factor, an increase in the ripple of the output voltage, an increase in noise, and an increase in choke noise. For this reason, it is impossible for the interleaved switching-mode power source of the related art to automatically make the on-intervals of switching currents of the first and second critical-mode boost-chopper converters identical to each other, thereby making it likely to necessitate screening at the time of mass production. Accordingly, particularly in a case where two or more critical-mode boost-chopper converters are used to constitute a multi-stage critical-current interleaved switching-mode power supply, there has been a problem with mass production.

In view of these situations, an object of one aspect of the present invention is to provide a control circuit that controls an interleaved power supply, and an interleaved power supply including that control circuit, which are unlikely to be affected by a variation among components and are suitable for mass production.

Means for Solving the Problems

One aspect of the present invention proposes the following.

One aspect of the present invention proposes a control circuit for an interleaved power supply. The interleaved power supply includes: a master converter including a master switch configured to perform switching operation; and a slave converter including a slave switch configured to perform switching operation while maintaining a predetermined phase difference with respect to the switching operation of the master switch. The master converter and the slave converter have a master-slave relationship. The control circuit is configured to control the switching operation of the slave switch. The control circuit includes, but is not limited to: a clock generator configured to generate a clock pulse having a predetermined frequency; a signal doubler configured to generate a master switch on-interval pulse signal indicating information concerning an on-interval of the master switch based on the clock pulse and a master drive pulse signal that switch-drives the master switch of the master converter, and generate a doubled duty pulse signal having a duty that is double that of the master switch on-interval pulse signal; an edge pulse generator configured to generate a first edge pulse signal based on the master drive pulse signal, and generate a second edge pulse signal based on the doubled duty pulse signal; and a slave drive pulse signal generator configured to generate, based on the first edge pulse signal and the second edge pulse signal, a slave drive pulse signal that switch-drives the slave switch so that an on-interval of the slave switch is identical to an on-interval of the master switch.

According to one aspect of the present invention, the clock generator generates a clock pulse having a predetermined frequency. Additionally, the signal doubler generates a master switch on-interval pulse signal indicating information concerning an on-interval of the master switch based on the clock pulse and a master drive pulse signal that switch-drives the master switch of the master converter, and generate a doubled duty pulse signal having a duty that is double that of the master switch on-interval pulse signal. Further, the edge pulse generator generates a first edge pulse signal based on the master drive pulse signal, and generates a second edge pulse signal based on the doubled duty pulse signal. The slave drive pulse signal generator generates, based on the first edge pulse signal and the second edge pulse signal, a slave drive pulse signal that switch-drives the slave switch so that an on-interval of the slave switch is identical to an on-interval of the master switch.

One aspect of the present invention proposes the control circuit such that the first edge pulse signal is generated in synchronization with a negative edge timing of the master drive pulse signal or a timing of the first clock pulse after the negative edge timing of the master drive pulse signal.

According to one aspect of the present invention, the first edge pulse signal is generated in synchronization with a negative edge timing of the master drive pulse signal or a timing of the first clock pulse after the negative edge timing of the master drive pulse signal.

One aspect of the present invention proposes the control circuit such that the second edge pulse signal is generated in synchronization with a negative edge timing of the doubled duty pulse signal.

According to one aspect of the present invention, the second edge pulse signal is generated in synchronization with a negative edge timing of the doubled duty pulse signal.

One aspect of the present invention proposes an interleaved power supply including: a master converter including a master switch configured to perform switching operation; a slave converter including a slave switch configured to perform switching operation while maintaining a predetermined phase difference with respect to the switching operation of the master switch; and a control circuit configured to control the switching operation of the slave switch. The master converter and the slave converter have a master-slave relationship. The control circuit includes, but is not limited to: a clock generator configured to generate a clock pulse having a predetermined frequency; a signal doubler configured to generate a master switch on-interval pulse signal indicating information concerning an on-interval of the master switch based on the clock pulse and a master drive pulse signal that switch-drives the master switch of the master converter, and generate a doubled duty pulse signal having a duty that is double that of the master switch on-interval pulse signal; an edge pulse generator configured to generate a first edge pulse signal based on the master drive pulse signal, and generate a second edge pulse signal based on the doubled duty pulse signal; and a slave drive pulse signal generator configured to generate, based on the first edge pulse signal and the second edge pulse signal, a slave drive pulse signal that switch-drives the slave switch so that an on-interval of the slave switch is identical to an on-interval of the master switch.

According to one aspect of the present invention, the clock generator generates a clock pulse having a predetermined frequency. Additionally, the signal doubler generates a master switch on-interval pulse signal indicating information concerning an on-interval of the master switch based on the clock pulse and a master drive pulse signal that switch-drives the master switch of the master converter, and generate a doubled duty pulse signal having a duty that is double that of the master switch on-interval pulse signal. Further, the edge pulse generator generates a first edge pulse signal based on the master drive pulse signal, and generates a second edge pulse signal based on the doubled duty pulse signal. The slave drive pulse signal generator generates, based on the first edge pulse signal and the second edge pulse signal, a slave drive pulse signal that switch-drives the slave switch so that an on-interval of the slave switch is identical to an on-interval of the master switch.

One aspect of the present invention proposes the interleaved power supply such that the first edge pulse signal is generated in synchronization with a negative edge timing of the master drive pulse signal or a timing of the first clock pulse after the negative edge timing of the master drive pulse signal.

According to one aspect of the present invention, the first edge pulse signal is generated in synchronization with a negative edge timing of the master drive pulse signal or a timing of the first clock pulse after the negative edge timing of the master drive pulse signal.

One aspect of the present invention proposes the interleaved power supply such that the second edge pulse signal is generated in synchronization with a negative edge timing of the doubled duty pulse signal.

According to one aspect of the present invention, the second edge pulse signal is generated in synchronization with a negative edge timing of the doubled duty pulse signal.

One aspect of the present invention proposes a control circuit for an interleaved power supply. The interleaved power supply includes: a master converter including a master switch configured to perform switching operation; and a slave converter including a slave switch configured to switch while maintaining a predetermined phase difference with respect to the switching operation of the master switch. The master converter and the slave converter have a master-slave relationship. The control circuit is configured to control switching operation of the slave switch. The control circuit includes, but is not limited to: a clock generator configured to generate a clock pulse having a predetermined frequency; a divided signal doubler configured to: generate a master switch on-interval pulse signal indicating information concerning an on-interval of the master switch based on the clock pulse and a master drive pulse signal that switch-drives the master switch of the master converter; generate n divided signals each having a frequency and a duty ratio that are 1/n times those of the master switch on-interval pulse signal (where n is an integer that is 2 or more), and generate doubled duty pulse signals each having a duty that is double that of each of the divided signals; an edge pulse generator configured to generate a first edge pulse signal based on the master drive pulse signal, and generate a second edge pulse signal based on the doubled duty pulse signals; and a slave drive pulse signal generator configured to generate, based on the first edge pulse signal and the second edge pulse signal, a slave drive pulse signal that switch-drives the slave switch so that an on-interval of the slave switch is identical to an on-interval of the master switch.

According to one aspect of the present invention, the clock generator generates a clock pulse having a predetermined frequency. Additionally, the divided signal doubler generates a master switch on-interval pulse signal indicating information concerning an on-interval of the master switch based on the clock pulse and a master drive pulse signal that switch-drives the master switch of the master converter, generates n divided signals each having a frequency and a duty ratio that are 1/n times those of the master switch on-interval pulse signal (where n is an integer that is 2 or more), and generates doubled duty pulse signals each having a duty that is double that of each of the divided signals. Further, the edge pulse generator generates a first edge pulse signal based on the master drive pulse signal, and generates a second edge pulse signal based on the doubled duty pulse signals. The slave drive pulse signal generator generates, based on the first edge pulse signal and the second edge pulse signal, a slave drive pulse signal that switch-drives the slave switch so that an on-interval of the slave switch is identical to an on-interval of the master switch.

One aspect of the present invention proposes the control circuit such that the first edge pulse signal is generated in synchronization with a negative edge timing of the master drive pulse signal or a timing of the first clock pulse after the negative edge timing of the master drive pulse signal.

According to one aspect of the present invention, the first edge pulse signal is generated in synchronization with a negative edge timing of the master drive pulse signal or a timing of the first clock pulse after the negative edge timing of the master drive pulse signal.

One aspect of the present invention proposes the control circuit such that the second edge pulse signal is generated in synchronization with negative edge timings of the doubled duty pulse signals.

According to one aspect of the present invention, the second edge pulse signal is generated in synchronization with negative edge timings of the doubled duty pulse signals.

One aspect of the present invention proposes an interleaved power supply including: a master converter including a master switch configured to perform switching operation; a slave converter including a slave switch configured to switching operation while maintaining a predetermined phase difference with respect to the switching operation of the master switch; and a control circuit configured to control the switching operation of the slave switch. The master converter and the slave converter have a master-slave relationship. The control circuit includes, but is not limited to: a clock generator configured to generate a clock pulse having a predetermined frequency; a divided signal doubler configured to generate a master switch on-interval pulse signal indicating information concerning an on-interval of the master switch based on the clock pulse and a master drive pulse signal that switch-drives the master switch of the master converter, generate n divided signals each having a frequency and a duty ratio that are 1/n times those of the master switch on-interval pulse signal (where n is an integer that is 2 or more), and generate doubled duty pulse signals each having a duty that is double that of each of the divided signals; an edge pulse generator configured to generate a first edge pulse signal based on the master drive pulse signal, and generate a second edge pulse signal based on the doubled duty pulse signals; and a slave drive pulse signal generator configured to generate, based on the first edge pulse signal and the second edge pulse signal, a slave drive pulse signal that switch-drives the slave switch so that an on-interval of the slave switch is identical to an on-interval of the master switch.

According to one aspect of the present invention, the clock generator generates a clock pulse having a predetermined frequency. Additionally, the divided signal doubler generates a master switch on-interval pulse signal indicating information concerning an on-interval of the master switch based on the clock pulse and a master drive pulse signal that switch-drives the master switch of the master converter, generates n divided signals each having a frequency and a duty ratio that are 1/n times those of the master switch on-interval pulse signal (where n is an integer that is 2 or more), and generates doubled duty pulse signals each having a duty that is double that of each of the divided signals. Further, the edge pulse generator generates a first edge pulse signal based on the master drive pulse signal, and generates a second edge pulse signal based on the doubled duty pulse signals. The slave drive pulse signal generator generates, based on the first edge pulse signal and the second edge pulse signal, a slave drive pulse signal that switch-drives the slave switch so that an on-interval of the slave switch is identical to an on-interval of the master switch.

One aspect of the present invention proposes the interleaved power supply such that the first edge pulse signal is generated in synchronization with a negative edge timing of the master drive pulse signal or a timing of the first clock pulse after the negative edge timing of the master drive pulse signal.

According to one aspect of the present invention, the first edge pulse signal is generated in synchronization with a negative edge timing of the master drive pulse signal or a timing of the first clock pulse after the negative edge timing of the master drive pulse signal.

One aspect of the present invention proposes the interleaved power supply such that the second edge pulse signal is generated in synchronization with negative edge timings of the doubled duty pulse signals.

According to one aspect of the present invention, the second edge pulse signal is generated in synchronization with negative edge timings of the doubled duty pulse signals.

Effects of the Invention

According to one aspect of the present invention, the clock generator generates a clock pulse having a predetermined frequency. Additionally, the signal doubler generates a master switch on-interval pulse signal indicating information concerning an on-interval of the master switch based on the clock pulse and a master drive pulse signal that switch-drives the master switch of the master converter, and generate a doubled duty pulse signal having a duty that is double that of the master switch on-interval pulse signal. Further, the edge pulse generator generates a first edge pulse signal based on the master drive pulse signal, and generates a second edge pulse signal based on the doubled duty pulse signal. The slave drive pulse signal generator generates, based on the first edge pulse signal and the second edge pulse signal, a slave drive pulse signal that switch-drives the slave switch so that an on-interval of the slave switch is identical to an on-interval of the master switch. For this reason, it is possible to make the on-interval of the switching current of the slave switch substantially identical to the on-interval of the switching current of the master switch. Thus, it is possible to easily achieve a control circuit that controls an interleaved power supply, which is unlikely to be affected by a variation among components and is suitable for mass production.

According to one aspect of the present invention, the first edge pulse signal is generated in synchronization with a negative edge timing of the master drive pulse signal or a timing of the first clock pulse after the negative edge timing of the master drive pulse signal. For this reason, it is possible to accurately and reliably make the on-interval of the switching current of the slave switch substantially identical to the on-interval of the switching current of the master switch. Particularly, the method of generating the first edge pulse signal in synchronization with the timing of the first clock pulse after the negative edge timing of the master drive pulse signal is a method such that the end point of the master drive pulse signal is synchronized with the timing of the clock pulse. For this reason, it is possible to generate the slave switching drive pulse signal more accurately than in the case of using the method of generating the first edge pulse signal in synchronization with the negative edge timing of the master drive pulse signal.

According to one aspect of the present invention, the second edge pulse signal is generated in synchronization with a negative edge timing of the doubled duty pulse signal. For this reason, it is possible to accurately and reliably make the on-interval of the switching current of the slave switch identical to the on-interval of the switching current of the master switch.

According to one aspect of the present invention, the clock generator generates a clock pulse having a predetermined frequency. Additionally, the signal doubler generates a master switch on-interval pulse signal indicating information concerning an on-interval of the master switch based on the clock pulse and a master drive pulse signal that switch-drives the master switch of the master converter, and generate a doubled duty pulse signal having a duty that is double that of the master switch on-interval pulse signal. Further, the edge pulse generator generates a first edge pulse signal based on the master drive pulse signal, and generates a second edge pulse signal based on the doubled duty pulse signal. The slave drive pulse signal generator generates, based on the first edge pulse signal and the second edge pulse signal, a slave drive pulse signal that switch-drives the slave switch so that an on-interval of the slave switch is identical to an on-interval of the master switch. For this reason, it is possible to make the on-interval of the switching current of the slave switch substantially identical to the on-interval of the switching current of the master switch. Thus, it is possible to easily achieve an interleaved power supply which is unlikely to be affected by a variation among components and is suitable for mass production.

According to one aspect of the present invention, the first edge pulse signal is generated in synchronization with a negative edge timing of the master drive pulse signal or a timing of the first clock pulse after the negative edge timing of the master drive pulse signal. For this reason, it is possible to accurately and reliably make the on-interval of the switching current of the slave switch substantially identical to the on-interval of the switching current of the master switch. Particularly, the method of generating the first edge pulse signal in synchronization with the timing of the first clock pulse after the negative edge timing of the master drive pulse signal is a method such that the end point of the master drive pulse signal is synchronized with the timing of the clock pulse. For this reason, it is possible to generate the slave switching drive pulse signal more accurately than in the case of using the method of generating the first edge pulse signal in synchronization with the negative edge timing of the master drive pulse signal.

According to one aspect of the present invention, the second edge pulse signal is generated in synchronization with a negative edge timing of the doubled duty pulse signal. For this reason, it is possible to accurately and reliably make the on-interval of the switching current of the slave switch identical to the on-interval of the switching current of the master switch.

According to one aspect of the present invention, the clock generator generates a clock pulse having a predetermined frequency. Additionally, the divided signal doubler generates a master switch on-interval pulse signal indicating information concerning an on-interval of the master switch based on the clock pulse and a master drive pulse signal that switch-drives the master switch of the master converter, generates n divided signals each having a frequency and a duty ratio that are 1/n times those of the master switch on-interval pulse signal (where n is an integer that is 2 or more), and generates doubled duty pulse signals each having a duty that is double that of each of the divided signals. Further, the edge pulse generator generates a first edge pulse signal based on the master drive pulse signal, and generates a second edge pulse signal based on the doubled duty pulse signals. The slave drive pulse signal generator generates, based on the first edge pulse signal and the second edge pulse signal, a slave drive pulse signal that switch-drives the slave switch so that an on-interval of the slave switch is identical to an on-interval of the master switch. For this reason, it is possible to make the on-interval of the switching current of the slave switch substantially identical to the on-interval of the switching current of the master switch even when the duty of the switching operation of the master converter varies. Thus, it is possible to easily achieve a control circuit that controls an interleaved power supply, which is unlikely to be affected by a variation among components and is suitable for mass production.

According to one aspect of the present invention, the first edge pulse signal is generated in synchronization with a negative edge timing of the master drive pulse signal or a timing of the first clock pulse after the negative edge timing of the master drive pulse signal. For this reason, it is possible to accurately and reliably make the on-interval of the switching current of the slave switch substantially identical to the on-interval of the switching current of the master switch even when the duty of the switching operation of the master converter varies. Particularly, the method of generating the first edge pulse signal in synchronization with the timing of the first clock pulse after the negative edge timing of the master drive pulse signal is a method such that the end point of the master drive pulse signal is synchronized with the timing of the clock pulse. For this reason, it is possible to generate the slave switching drive pulse signal more accurately than in the case of using the method of generating the first edge pulse signal in synchronization with the negative edge timing of the master drive pulse signal.

According to one aspect of the present invention, the second edge pulse signal is generated in synchronization with negative edge timings of the doubled duty pulse signals. For this reason, it is possible to accurately and reliably make the on-interval of the switching current of the slave switch identical to the on-interval of the switching current of the master switch even when the duty of the switching operation of the master converter varies.

According to one aspect of the present invention, the clock generator generates a clock pulse having a predetermined frequency. Additionally, the divided signal doubler generates a master switch on-interval pulse signal indicating information concerning an on-interval of the master switch based on the clock pulse and a master drive pulse signal that switch-drives the master switch of the master converter, generates n divided signals each having a frequency and a duty ratio that are 1/n times those of the master switch on-interval pulse signal (where n is an integer that is 2 or more), and generates doubled duty pulse signals each having a duty that is double that of each of the divided signals. Further, the edge pulse generator generates a first edge pulse signal based on the master drive pulse signal, and generates a second edge pulse signal based on the doubled duty pulse signals. The slave drive pulse signal generator generates, based on the first edge pulse signal and the second edge pulse signal, a slave drive pulse signal that switch-drives the slave switch so that an on-interval of the slave switch is identical to an on-interval of the master switch. For this reason, it is possible to make the on-interval of the switching current of the slave switch substantially identical to the on-interval of the switching current of the master switch even when the duty of the switching operation of the master converter varies. Thus, it is possible to easily achieve an interleaved power supply which is unlikely to be affected by a variation among components and is suitable for mass production.

According to one aspect of the present invention, the first edge pulse signal is generated in synchronization with a negative edge timing of the master drive pulse signal or a timing of the first clock pulse after the negative edge timing of the master drive pulse signal. For this reason, it is possible to accurately and reliably make the on-interval of the switching current of the slave switch substantially identical to the on-interval of the switching current of the master switch even when the duty of the switching operation of the master converter varies. Particularly, the method of generating the first edge pulse signal in synchronization with the timing of the first clock pulse after the negative edge timing of the master drive pulse signal is a method such that the end point of the master drive pulse signal is synchronized with the timing of the clock pulse. For this reason, it is possible to generate the slave switching drive pulse signal more accurately than in the case of using the method of generating the first edge pulse signal in synchronization with the negative edge timing of the master drive pulse signal.

According to one aspect of the present invention, the second edge pulse signal is generated in synchronization with negative edge timings of the doubled duty pulse signals. For this reason, it is possible to accurately and reliably make the on-interval of the switching current of the slave switch identical to the on-interval of the switching current of the master switch even when the duty of the switching operation of the master converter varies.

BEST MODE FOR CARRYING OUT THE INVENTION

Hereinafter, embodiments of the present invention are explained with reference to drawings. Here, constituent elements of the present embodiment may be appropriately replaced with existing constituent elements and like, and various variations including combinations of the constituent elements of the present embodiment and other existing constituent elements may be made. Accordingly, the claimed invention is not limited to the present embodiment.
(Connection of Interleaved Power Supply)

Figure 1:
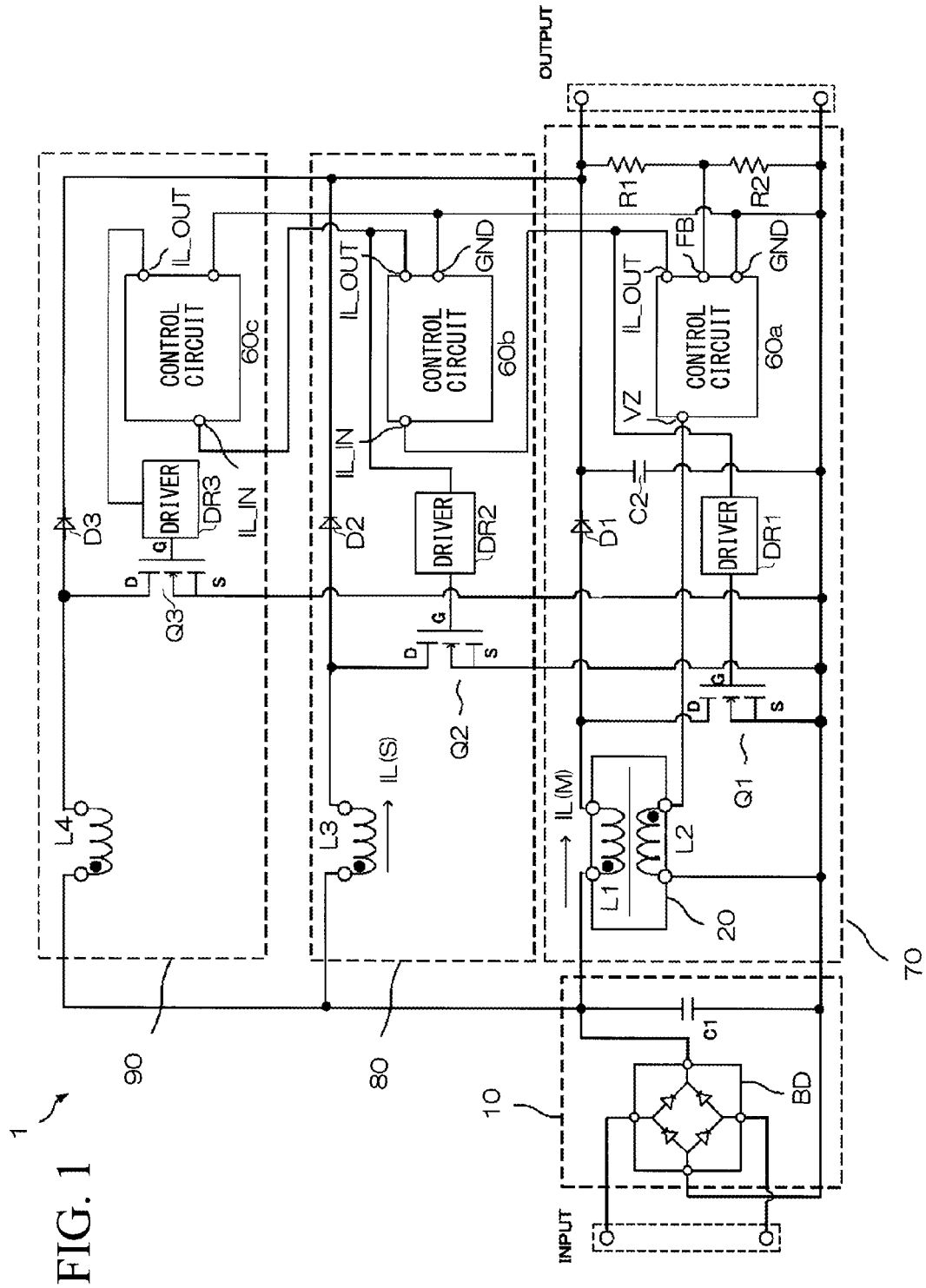
FIG. 1 is a circuit diagram illustrating a configuration of an interleaved power supply including a control circuit according to an embodiment of the present invention.

FIG. 1 is a diagram illustrating connection of an interleaved power supply including a control circuit according to an embodiment of the present invention. As shown in FIG. 1, the control circuit according to the present embodiment includes: a master converter 70 including a master switch Q1 that performs switching operation; and a slave converter 80 including a slave-switch Q2 that performs switching operation while maintaining a predetermined phase difference with respect to the switching operation of the master switch Q1. The control circuit is used for an interleaved switching-mode power supply 1 including a multi-stage converter including multiple converters having the master-slave relationship. As shown in FIG. 1, the interleaved switching power supply 1 includes: a rectifier circuit 10; the master converter 70; the slave converter 80; and a slave converter 90.

In the configuration shown in FIG. 1, a control circuit 60a and a control circuit 60b have a master-slave relationship such that the control circuit 60a serves as a master-converter-side control circuit, and the control circuit 60b serves as a slave-converter-side control circuit. Additionally, a control circuit 60b and a control circuit 60c have a master-slave relationship such that the control circuit 60b serves as a master-converter-side control circuit, and the control circuit 60c serves as a slave-converter-side control circuit. In other words, the master converter 70 and the slave converter 80 have a relationship such that the master converter 70 is on the master converter side, and the slave converter 80 is on the slave converter side. Additionally, the slave converter 80 and the slave converter 90 have a relationship such that the slave converter 80 is on the master converter side, and the slave converter 90 is on the slave converter side. Here, the interleaved switching-mode power supply 1 shown in FIG. 1 is a three-stage interleaved power supply. However, an additional slave-converter may be provided to form a master-slave relationship such that the slave converter 90 is on the master converter side. For easy understanding of explanation, explanation is given focusing on the relationship between the control circuit 60a and the control circuit 60b.

The rectifier circuit 10, for example, full-wave rectifies alternate current of a commercial power supply. The rectifier circuit 10 includes: a bridge diode BD that rectifies the current that is full-wave rectified; and a capacitor C1. The master converter 70, the slave converter 80, and the like are coupled to the rectifier circuit 10. FIG. 1 shows a case where the master converter 70, the slave converter 80, and the like are constituted by boost-chopper circuits.

The master converter 70 includes: a transformer 20; a master switch Q1; a diode D1; a capacitor C2; a control circuit 60a; a driver DR1; a resistor R1; and a resistor R2. The slave converter 80 includes: a choke coil L3; a slave switch Q2; a diode D2; and a control circuit 60b.

The transformer 20 includes: a choke coil L1; a control coil L2; and a magnetic core (not shown). The transformer 20 stores energy corresponding to the difference between the input and output voltages in the choke coil L1 when the master switch Q1 is on, and supplies the energy stored in the choke coil L1 to a load when the master switch Q1 is off. The control coil L2 supplies to a VZ terminal of the control circuit 60a, a signal corresponding to current flowing through the choke coil L1. This signal becomes a trigger signal for turning on the master switch Q1.

The control circuit 60a is configured to control the on-timing and on-interval of the master switch Q1 based on the signals input to the VZ terminal and the FB terminal.

In other words, the VZ terminal of the control circuit 60a is coupled to the control coil L2 of the transformer 20, and a signal corresponding to the current flowing through the choke coil L1 is input to the control circuit 60a. Accordingly, the control circuit 60a turns on the master switch Q1 at the timing at which the current flowing through the choke coil L1 becomes zero, thus enabling the critical operation.

The switching control of the master switch Q1 is performed by a drive pulse signal from a terminal IL_OUT of the control circuit 60a being input to the control terminal of the master switch Q1 via the driver DR1. Additionally, the resistors R1 and R2 for detecting the output voltage are coupled to the FB terminal of the control circuit 60a. When a divided voltage value of the output voltage divided by the resistors R1 and R2 becomes greater than a predetermined voltage, the control circuit 60a controls the on-interval of the master switch Q1 to be decreased.

Configuration of Control Circuit 60b as First Embodiment

Next, a configuration of the slave-converter-side control circuit 60b (first embodiment) is explained with reference to FIG. 2.

Figure 2:
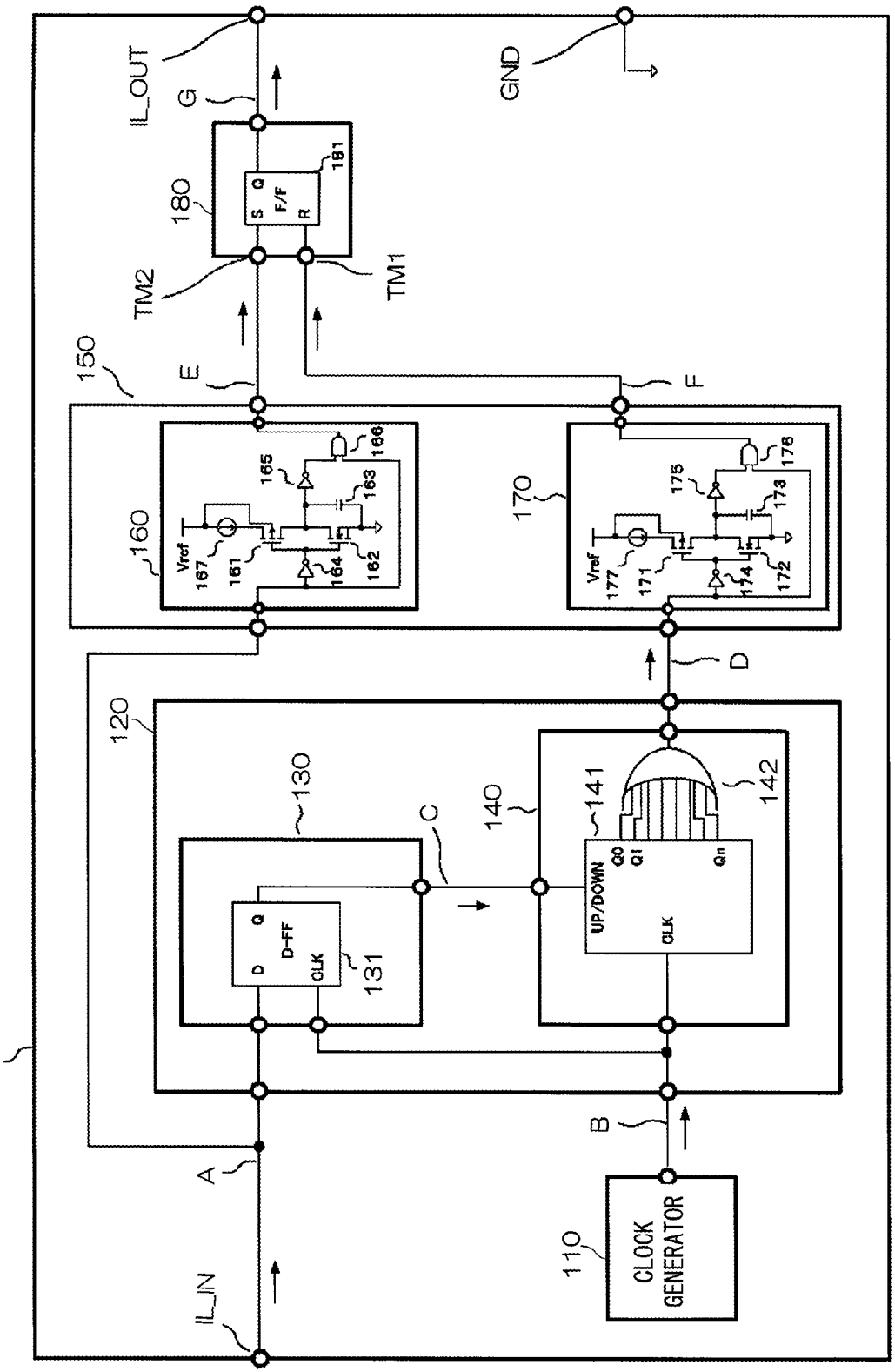
FIG. 2 is a circuit diagram illustrating a configuration of a control circuit according to a first embodiment of the present invention.

FIG. 2 is a circuit diagram illustrating a configuration of the control circuit according to the first embodiment of the present invention. The control circuit 60b is used for an interleaved power supply having the master-slave relationship as shown in FIG. 1.

As shown in FIG. 2, the control circuit 60b includes: a clock generator 110; a signal doubler 120; an edge pulse generator 150; and a slave drive pulse signal generator 180.

The clock generator 110 is configured to generate a clock pulse having a predetermined frequency. The frequency of the clock pulse generated by the clock generator 110 is preferably set to be approximately 15 MHz when the design is such that the master switch Q1 and the slave switch Q2 perform switching at 50 kHz to 500 kHz. Thereby, it is possible to make an on-interval signal of the slave drive pulse signal substantially identical to that of the master drive pulse signal, thereby stabilizing the critical current operation of the slave converter 80. Thus, the frequency of the clock pulse is set to be sufficiently high compared to the switching frequencies of the master switch Q1 and the slave switch Q2, thereby making the critical current operation of the slave converter 80 more reliable.

The signal doubler 120 includes, for example, a master switch on-interval pulse generation circuit 130 and a doubled duty pulse signal generator 140. The signal doubler 120 is configured to generate a master switch on-interval pulse signal C indicating information concerning the on-interval of the master switch Q1, based on a master drive pulse signal A that switch-drives the master switch Q1 and a clock pulse B, and generate a doubled duty pulse signal D having the time interval that is double that of the master switch on-interval pulse signal C.

The master switch on-interval generation circuit 130 in the signal doubler 120 can be easily designed if constituted by, for example, a D flip-flop 131. A configuration is made such that a master drive pulse signal A is input to a first input terminal D of the D flip-flop 131, and a clock pulse B generated by the clock generator 110 is input to a second input terminal CLK. Additionally, an output terminal Q of the D flip-flop 131 is coupled to an input terminal UP/DOWN of an up-down counter 141. The master switch on-interval pulse generator 130 is configured to generate a master switch on-interval pulse signal C based on the master drive pulse signal A that switch-drives the master switch Q1 and the clock pulse B.

The doubled duty pulse signal generator 140 can be easily designed if constituted by, for example, an up-down counter 141 that can count by adding and subtracting values sequentially, and an OR circuit 142. A configuration is made such that a master switch on-interval pulse signal C generated by the master switch on-interval pulse generation circuit 130 is input to a first input terminal UP/DOWN of the up-down counter 141. Additionally, A configuration is made such that the clock pulse B generated by the clock generator 110 is input to a second input terminal CLK of the up-down counter 141.

Further, counter outputs Q (Q0 to Qn) of the up-down counter 141 are coupled to respective inputs of the OR circuit 142, and outputs thereof are coupled to the edge pulse generator 150. The up-down counter 141 is configured to generate a doubled duty pulse signal D having a time interval that is double that of the master switch on-interval pulse signal C, based on the input master switch on-interval pulse signal C and the input clock pulse B.

The edge pulse generator 150 includes, for example, a first edge pulse signal generation circuit 160 and a second edge pulse signal generation circuit 170. The edge pulse generator 150 is configured to generate a first edge pulse signal E based on the master drive pulse signal A, and generate a second edge pulse signal F based on the doubled duty pulse signal D.

Figure 4:
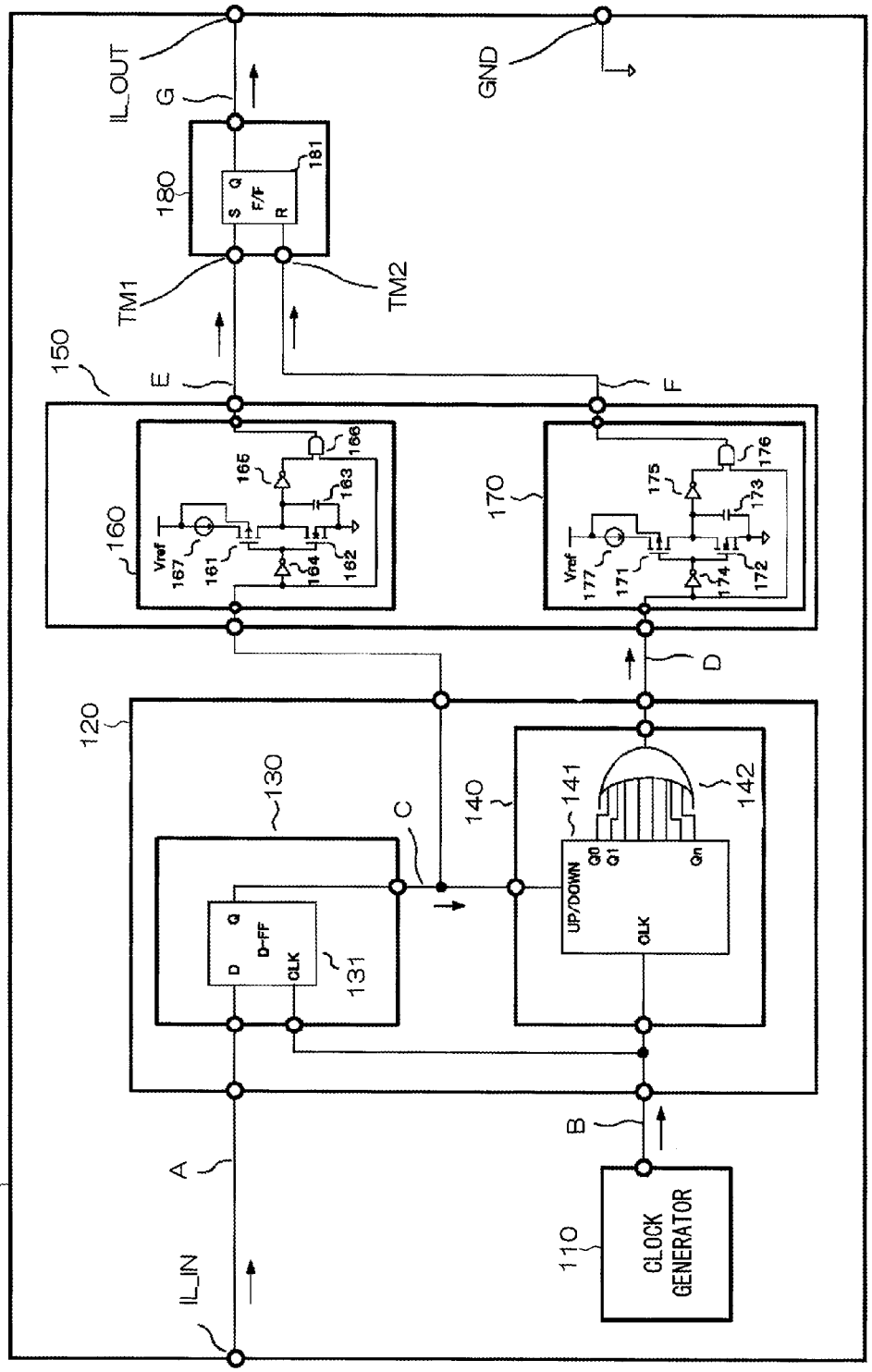
FIG. 4 is a circuit diagram illustrating a modified example of the control circuit 60b shown in FIG. 2.

A configuration is made such that the first edge pulse signal E is generated in synchronization with the negative edge timing of the master drive pulse signal A or the timing of the clock pulse B that first occurs after the negative edge timing of the master drive pulse signal A. A configuration may be made as shown in FIG. 2 in order for the first edge pulse signal E to be generated in synchronization with the negative edge timing of the master drive pulse signal A. Additionally, a configuration may be made as shown in FIG. 4 in order for the first edge pulse signal E to be generated in synchronization with the timing of the clock pulse B that first occurs after the negative edge timing of the master drive pulse signal A.

A configuration is made such that the second edge pulse signal F is generated in synchronization with the negative edge timing of the doubled duty pulse signal D.

Additionally, a configuration is made such that the first edge pulse signal E is generated in synchronization with the positive edge timing of the master drive pulse signal A or the timing of the first clock pulse after the positive edge timing of the master drive pulse signal A. The second edge pulse signal F may be generated in synchronization with the positive edge timing of the doubled duty pulse signal D.

A configuration is made such that the slave drive pulse signal G has a start point at the timing at which the first edge pulse signal E occurs and an end point at the timing at which the second edge pulse signal F occurs.

Alternatively, the slave drive pulse signal G may have a start point at the timing at which the second edge pulse signal F occurs and an end point at the timing at which the first edge pulse signal E occurs.

The edge pulse generator 150 is configured to include, for example, two input terminals and two output terminals. A configuration is made such that the master drive pulse signal A input via the terminal IL_IN is input to one of the input terminals of the edge pulse generator 150 (an input unit of the first edge pulse signal generation circuit 160).

A configuration is made such that the doubled duty pulse signal D generated by the doubled duty pulse signal generator 140 is input to the other one of the input terminals of the edge pulse generator 150 (an input unit of the second edge pulse signal generation circuit 170). One of the output terminals of the edge pulse generator 150 is coupled to a first input terminal TM1 of the slave drive pulse signal generator 180. The other one of the output terminals of the edge pulse generator 150 is coupled to a second input terminal TM2 of the slave drive pulse signal generator 180.

The first edge pulse signal generation circuit 160 includes: a switch 161; a switch 162; a capacitor element 163; an inverter 164; an inverter 165; an AND circuit 166; and a constant current source 167. The first edge pulse signal generation circuit 160 shown in FIG. 2 is configured to output a narrow pulse at a falling edge of the input master drive pulse signal A, and input the narrow pulse as the first edge pulse signal E to the first input terminal TM1 of the slave drive pulse signal generator 180. Additionally, the first edge pulse signal generation circuit 160 shown in FIG. 4 as will be explained later is configured to output a narrow pulse at a falling edge of the input master switch on-interval pulse signal C, and input the narrow pulse as the first edge pulse signal E to the first input terminal TM1 of the slave drive pulse signal generator 180.

The second edge pulse signal generation circuit 170 includes, for example: a switch 171; a switch 172; a capacitor element 173; an inverter 174; an inverter 175; an AND circuit 176; and a constant current source 177. The second edge pulse signal generation circuit 170 is configured to output a narrow pulse at a falling edge of the input doubled duty pulse signal D, and input the narrow pulse as the second edge pulse signal F to the second input terminal TM2 of the slave drive pulse signal generator 180.

The slave drive pulse signal generator 180 is configured to generate, based on the first edge pulse signal E and the second edge pulse signal F, a slave drive pulse signal G that switch-drives the slave switch Q2 so that the on-interval of the slave switch Q2 is identical to the on-interval of the master switch Q1.

The slave drive pulse signal generator 180 includes, for example, a flip-flop circuit 181. A set terminal S of the flip-flop circuit 181 is coupled to an output of the first edge pulse signal generation circuit 160 via the first input terminal TM1. A reset terminal R of the flip-flop circuit 181 is coupled to an output of the second edge pulse signal generation circuit 170 via the second input terminal TM2. A terminal Q of the flip-flop circuit 181, as the slave drive pulse signal G, is coupled to the terminal IL_OUT of the control circuit 60b.

The flip-flop circuit 181 is configured such that the signal output from the terminal Q becomes in a HIGH state when the narrow pulse as the first edge pulse signal E is input to the set terminal S, and the signal output from the terminal Q becomes in a LOW state when the narrow pulse as the second edge pulse signal F is input to the reset terminal R.

Modified Example of First Embodiment

Next, a modified example of the first embodiment with regard to the configuration of the control circuit 60b is explained with reference to FIG. 4.

FIG. 4 is a circuit diagram illustrating a modified example of the first embodiment with regard to the configuration of the control circuit 60b shown in FIG. 2. The control circuit 60b shown in FIG. 4 differs from the control circuit 60b shown in FIG. 2, and modification is made such that the first edge pulse signal E is generated in synchronization with the timing of the clock pulse B that first occurs after the negative edge timing of the master drive pulse signal A. For this reason, in the control circuit 60b shown in FIG. 4, the input terminal of the first edge pulse generation circuit 160 is coupled not to a node of the master drive pulse signal A (terminal IL_IN) shown in FIG. 4, but to a node of the master switch on-interval pulse signal C (output node of the master switch on-interval generation circuit 130).

Here, the above master switch Q1, the master converter 70, the slave switch Q2, the slave converter 80, the interleaved power supply 1, the control circuit 60b, the clock generator 110, the signal doubler 120, the edge pulse generator 150, and the slave drive pulse signal generator 180 respectively correspond a master switch, a master converter, a slave switch, a slave converter, an interleaved power supply, a control circuit, a clock generator, a signal doubler, an edge pulse generator, and a slave drive pulse signal generator of the present invention.

Operation of Control Circuit 60b as First Embodiment

Subsequently, operation of the control circuit 60b of the first embodiment is explained with reference to FIGS. 3 and 5.

Figure 3:
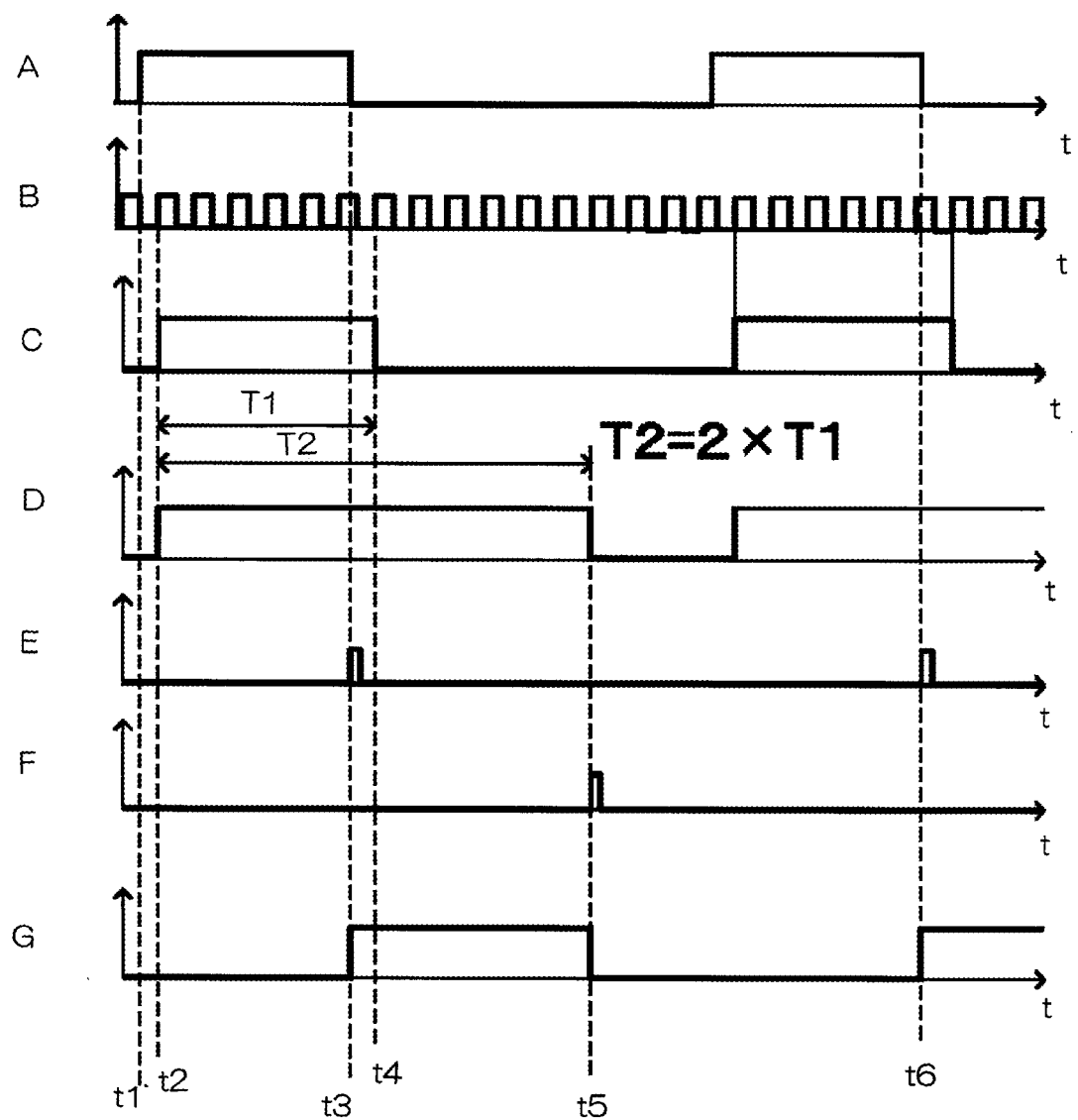
FIG. 3 is a timing chart illustrating operation of the control circuit 60b shown in FIG. 2

FIG. 3 is a timing chart illustrating the operation of the control circuit 60b as the first embodiment shown in FIGS. 2. A, B, C, D, E, F, and G shown in FIG. 3 respectively denote voltage waveforms of the master drive pulse signal A, the clock pulse B, the master switch on-interval pulse signal C, the doubled duty pulse signal D, the first edge pulse signal E, the second edge pulse signal F, and the slave drive pulse signal G, which are shown in FIG. 2.

Figure 5:
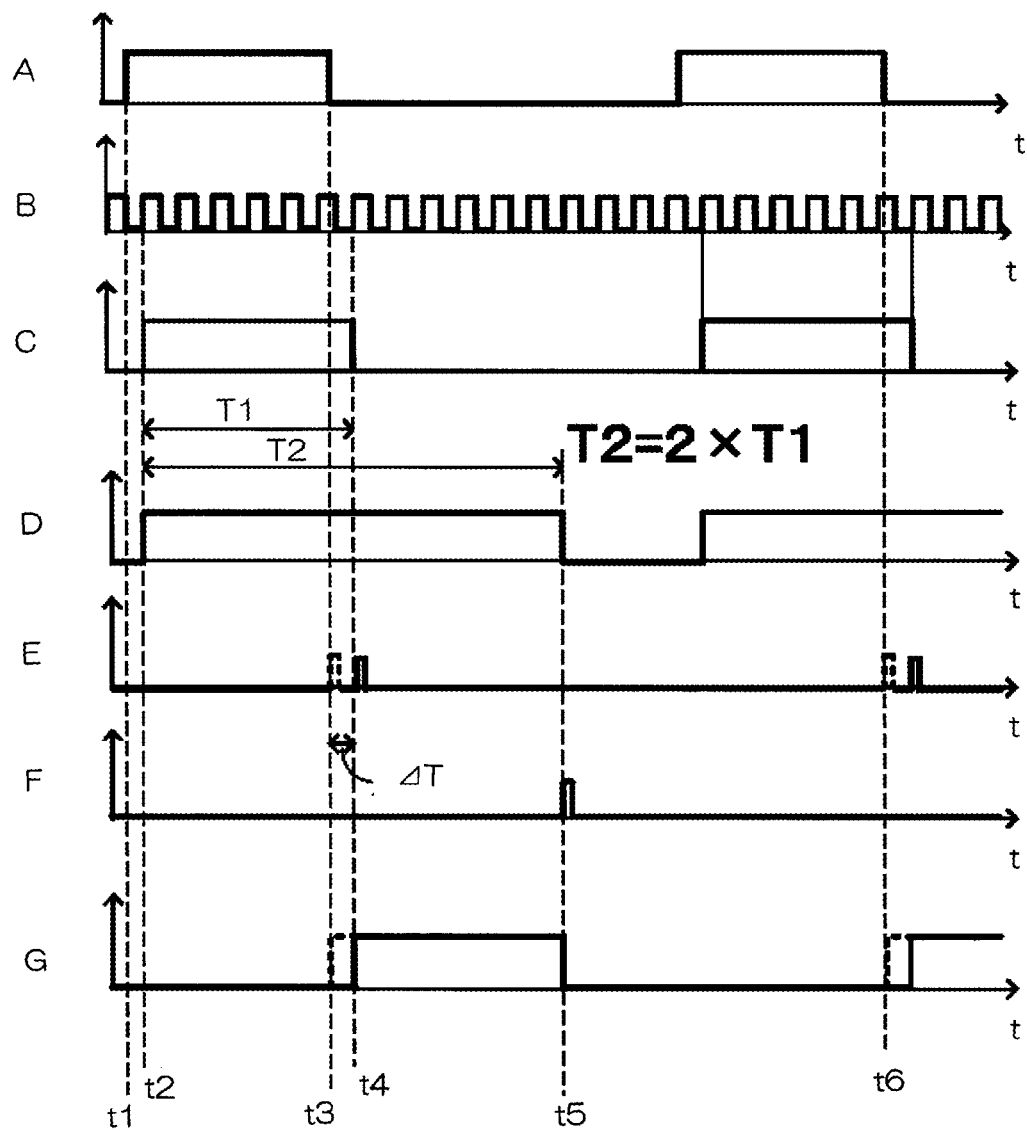
FIG. 5 is a timing chart illustrating the operation of the control circuit 60b shown in FIG. 4.

FIG. 5 is a timing chart illustrating the operation of the control circuit 60b shown in FIGS. 4. A, B, C, D, E, F, and G shown in FIG. 5 respectively denote voltage waveforms of the master drive pulse signal A, the clock pulse B, the master switch on-interval pulse signal C, the doubled duty pulse signal D, the first edge pulse signal E, the second edge pulse signal F, and the slave drive pulse signal G, which are shown in FIG. 2.

The master drive pulse signal A shown in FIG. 3 is synchronized with a signal that drive-controls the master switch Q1 shown in FIG. 1. Additionally, the clock pulse B shown in FIG. 3 is set to be, for example, a pulse of the frequency of 15 MHz. The master switch on-interval pulse signal C is generated as a signal indicating information concerning the on-interval of the master switch Q1. When the D flip-flop 131 is used as the master switch on-interval pulse generation circuit 130, the D flip-flop 131 is configured such that an input value of the terminal D at the positive edge timing of the clock pulse input to the CLK terminal is output to the terminal Q.

From time t1 to time t4 shown in FIG. 3, the master switch on-interval pulse C changes from LOW to HIGH at, for example, the positive edge timing of the clock pulse B (time t2 shown in FIG. 3) that first occurs after the time when the master drive pulse signal A becomes HIGH (time t1 shown in FIG. 3). Then (after time t2 shown in FIG. 3), the master switch on-interval pulse C changes from HIGHT to LOW at, for example, the positive edge timing of the clock pulse B (time t4 shown in FIG. 3) that first occurs after the time when the master drive pulse signal A becomes LOW (time t3 shown in FIG. 3).

Thus, the signal doubler 120 generates the master switch on-interval pulse signal C indicating information concerning the on-interval of the master switch Q1, based on the master drive pulse signal A that switch-drives the master switch Q1 of the master converter 70 and the clock pulse B.

Additionally, the signal doubler 120 generates the doubled duty pulse signal D having the time interval that is double that of the master switch on-interval pulse signal C. When the double duty pulse signal generator 140 in the signal doubler 120 is constituted by, for example, the up-down counter 141 or the OR circuit 142 as shown in FIG. 2, the up-down counter 141 is configured such that signals are output from the terminals Q0, Q1, Q2, . . . , Qn associated with the respective pulses input to the terminal CLK, and input to the OR circuit 142 in the interval in which an input value of the UP/DOWN terminal is HIGH (time t2 to time t4 shown in FIG. 3), and thus the clock pulse B is counted up. For this reason, the doubled duty pulse signal D is HIGH in the interval in which the input value of the UP/DOWN terminal is HIGH (from time t2 to time t4 shown in FIG. 3).

Then, after the time when the input value of the UP/DOWN terminal changes from HIGH to LOW (time t4 shown in FIG. 3), the up-down counter 141 counts down the clock pulse B by the same count number as the count number by which the clock pulse B has been counted up in the interval in which the input value of the UP/DOWN terminal is HIGH (from time t2 to time t4 shown in FIG. 3). For this reason, the doubled duty pulse signal D is HIGH in the same interval (interval T1 shown in FIG. 3) as the interval in which the input value of the UP/DOWN terminal is HIGH (from time t2 to time t4 shown in FIG. 3). Consequently, the doubled duty pulse signal D is a HIGH signal having the time interval (interval T2 shown in FIG. 3) that is double that of the master switch on-interval pulse signal C (from time t2 to time t5 shown in FIG. 3).

Thus, the signal doubler 120 generates the doubled duty pulse signal D having the duty that is double that of the master switch on-interval pulse signal C.

The edge pulse generator 150 shown in FIG. 2 generates the first edge pulse signal E based on the master drive pulse signal A, and generates the second edge pulse signal F based on the doubled duty pulse signal D. The edge pulse generator 150 shown in FIG. 4 generates the first edge pulse signal E based on the master switch on-interval pulse C, and generates the second edge pulse signal F based on the doubled duty pulse signal D.

In the case of the configuration shown in FIG. 2, the first edge pulse signal E is generated in synchronization with the negative edge timing of the master drive pulse signal A (time t3 shown in FIG. 3). Additionally, in the case of the configuration shown in FIG. 4, the first edge pulse signal E is generated in synchronization with the timing of the clock pulse B (time t4 shown in FIG. 5) that first occurs after the negative edge timing of the master drive pulse signal A (time t3 shown in FIG. 5).

The second edge pulse signal F is generated in synchronization with the negative edge timing of the doubled duty pulse signal D (time t5 shown in FIG. 3).

The slave drive pulse signal generator 180 generates the slave drive pulse signal G based on the first edge pulse signal E and the second edge pulse signal F. In the case of the configuration shown in FIG. 2, the slave drive pulse signal G is a HIGH level signal having a start point at the timing at which the first edge pulse signal E occurs (time t3 shown in FIG. 3) and an end point at the timing at which the second edge pulse signal F occurs (time t5 shown in FIG. 3). Additionally, in the case of the configuration shown in FIG. 4, the slave drive pulse signal G is a HIGH level signal having a start point at the timing at which the first edge pulse signal E occurs (time t4 shown in FIG. 5) and an end point at the timing at which the second edge pulse signal F occurs (time t5 shown in FIG. 5).

Here, in the control circuit 60b shown in FIG. 4, the end point of the master switch on-interval pulse signal C (time t4 shown in FIG. 5) is synchronized with the timing of the clock pulse B. For this reason, it is possible to generate the slave drive pulse signal more accurately than in the case of using the method of generating the first edge pulse E in synchronization with the negative edge timing of the master drive pulse signal A (time t3 shown in FIG. 5). Specifically, it is possible to make the master drive pulse signal A approximate the slave drive pulse signal G by the interval ΔT shown in FIG. 5.

Operation of Interleaved Switching-Mode Power Supply as First Embodiment

Subsequently, operation of the interleaved switching-mode power supply 1 shown in FIG. 1 is explained with reference to FIG. 6.

Figure 6:
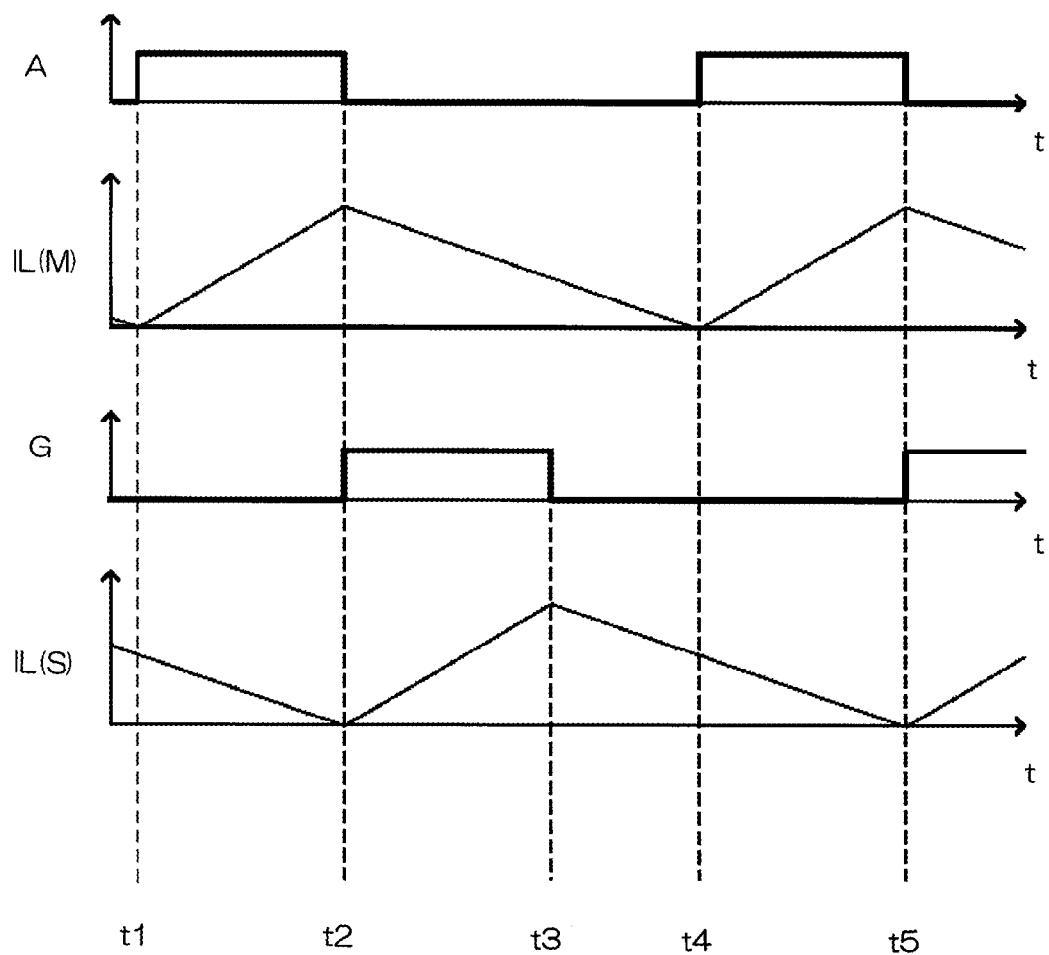
FIG. 6 is a timing chart illustrating operation of the interleaved switching-mode power supply shown in FIG. 1.

FIG. 6 is a timing chart illustrating operation of the interleaved switching-mode power supply shown in FIG. 1. If the control circuit 60b shown in FIG. 2 or 4 is applied to the interleaved switching-mode power supply 1 shown in FIG. 1, it is possible to control the choke current IL(M) flowing through the choke coil L1 and the choke current IL(S) flowing through the choke coil L3 while maintaining a predetermined phase difference therebetween. This is because the master drive pulse signal A and the slave drive pulse signal G are controlled so that the time intervals thereof are identical (including substantially identical) to each other, as shown in FIGS. 3 and 5.

In order to control the master drive pulse signal A and the slave drive pulse signal G so that the time intervals thereof are identical (including substantially identical) to each other, it is preferable to use the control circuit 60b in accordance with the specification of the input-output voltages of the power supply such that switching operation is performed with the duty of the master drive pulse signal A that is less than 50%.

As explained above, according to the first embodiment, the clock generator 110 generates the clock pulse B having a predetermined frequency. Additionally, the signal doubler 120 generates the master switch on-interval pulse signal C indicating the information concerning the on-interval of the master switch Q1, based on the master drive pulse signal A that switch-drives the master switch Q1 of the master converter 70 and the clock pulse B. Thus, the doubled duty pulse signal D having the duty that is double that of the master switch on-interval pulse signal C is generated. Further, the edge pulse generator 150 generates the first edge pulse signal E based on the master drive pulse signal A and generates the second edge pulse signal F based on the doubled duty pulse signal D. Based on the first edge pulse signal E and the second edge pulse signal F, the slave drive pulse signal generator 180 generates the slave drive pulse signal G that switch-drives the slave switch Q2 so that the on-interval of the slave switch Q2 is identical to the on-interval of the master switch Q1. For this reason, it is possible to make the on-intervals of the switching currents of the master converter 70 and the slave converter 80 substantially identical to each other. Thus, it is possible to easily achieve the interleaved power supply that is unlikely to be affected by a variation among components and is suitable for mass production. Particularly, when the control circuit 60b according to the first embodiment of the present invention is applied to an interleaved power supply including multiple converters that perform boost-chopping on a rectified output of a commercial power source, it is possible to reliably achieve critical current operation on the slave converter 80 side.

Additionally, according to the first embodiment, the first edge pulse signal E is generated in synchronization with the negative edge timing of the master drive pulse signal A or the timing of the clock pulse B that first occurs after the negative edge timing of the master drive pulse signal A. Accordingly, it is possible to accurately and reliably make the on-intervals of the switching currents of the master converter and the slave converter substantially identical to each other. Particularly, the method of generating the first edge pulse signal E in synchronization with the timing of the clock pulse B that first occurs after the negative edge timing of the master drive pulse signal A is a method such that the end point of the master drive pulse signal A is synchronized with the timing of the clock pulse B. For this reason, it is possible to generate the slave switching drive pulse signal G more accurately than in the case of using the method of generating the first edge pulse signal E in synchronization with the negative edge timing of the master drive pulse signal A.

Further, according to the first embodiment, the second edge pulse signal F is generated in synchronization with the negative edge timing of the doubled duty pulse signal D. Accordingly, it is possible to make the on-intervals of the switching currents of the master converter and the slave converter identical to each other.

Figure 7:
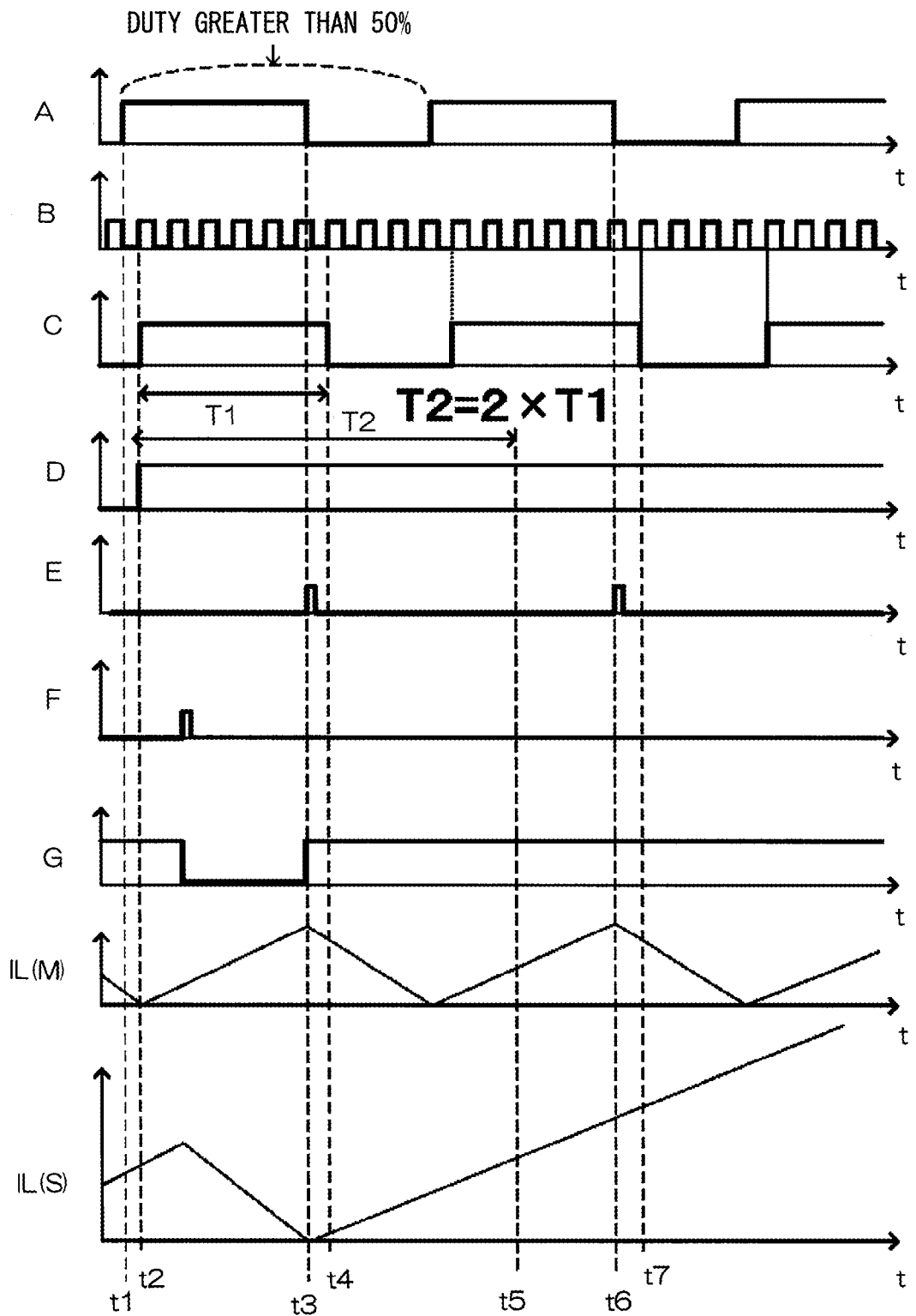
FIG. 7 is a timing chart illustrating operation of the control circuit 60b and the interleaved power supply 1 according to the first embodiment in a case where the duty of the master drive pulse signal shown in FIG. 2 is greater than or equal to 50%.

In the first embodiment, as explained above, it is preferable to use the control circuit 60b in accordance with the specification of the input-output voltages of the power supply such that switching operation is performed with the duty of the master drive pulse signal A that is less than 50%. It is not preferable to use the control circuit 60b in accordance with the specification of the input-output voltages of the power supply such that switching operation is performed with the duty of the master drive pulse signal A that is greater than or equal to 50%. FIG. 7 is a timing chart illustrating operation in a case where the control circuit 60b is used in accordance with the specification of the input-output voltages of the power supply such that switching operation is performed with the duty of the master drive pulse signal A that is greater than or equal to 50%. As shown in FIG. 7, it is not impossible to make the time intervals of the master drive pulse signal A and the slave drive pulse signal G identical (including substantially identical) to each other. Consequently, the interleaved power supply 1 shown in FIG. 1 including, for example, multiple converters that perform boost-chopping on a rectified output of a commercial power source cannot reliably achieve critical current operation on the slave converter 80 side.

Accordingly, if the control circuit 60b is used in accordance with the specification of the input-output voltages of the power supply such that switching operation is performed with the duty of the master drive pulse signal that is greater than or equal to 50%, it is preferable to use a control circuit 60b as a second embodiment explained hereinafter.

Configuration of Control Circuit 60b as Second Embodiment

Next, a configuration of the control circuit 60b (second embodiment) is explained with reference to FIG. 8.

Figure 8:
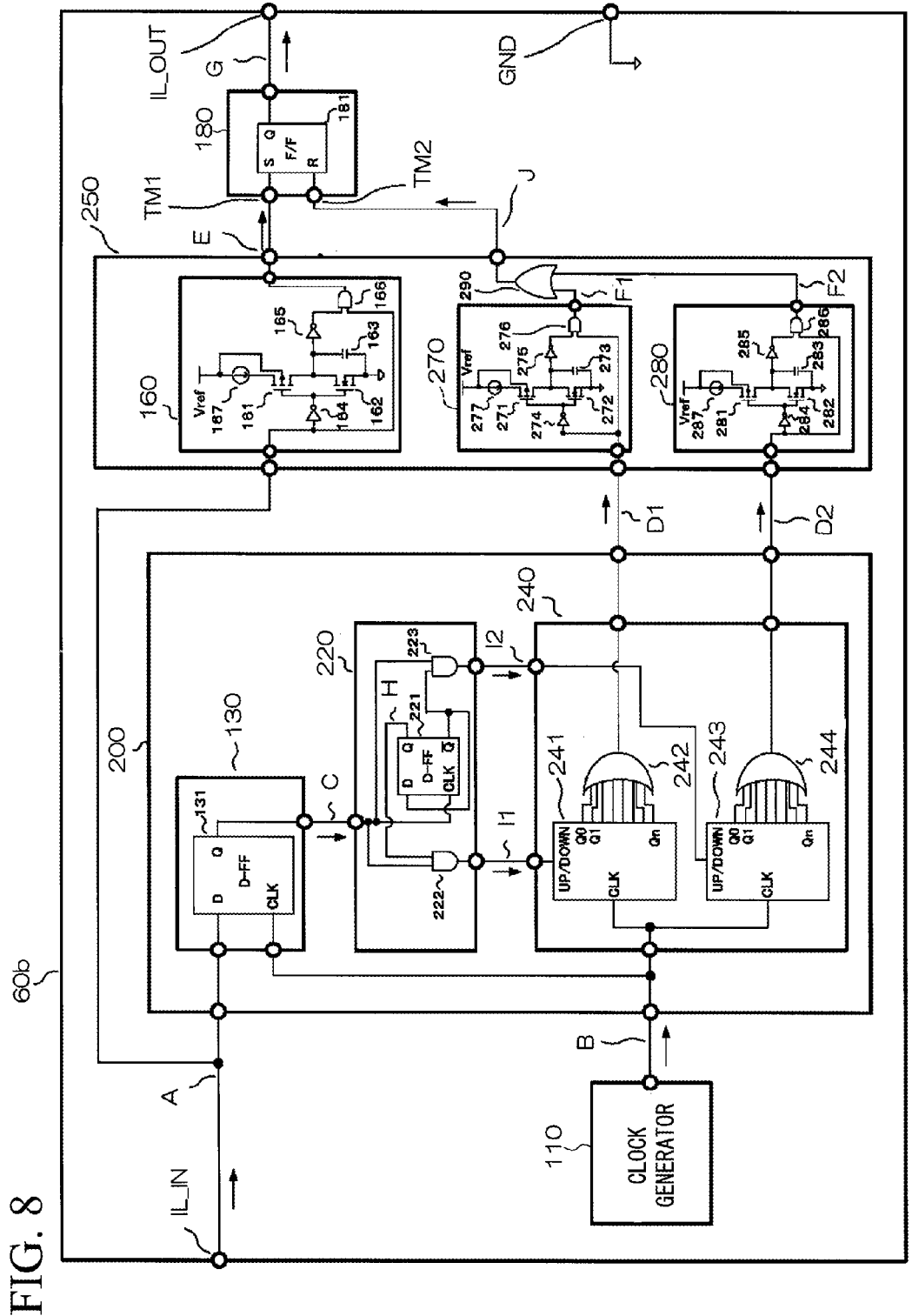
FIG. 8 is a circuit diagram illustrating a configuration of a control circuit according to a second embodiment of the present invention.

FIG. 8 is a circuit diagram illustrating a configuration of the control circuit 60b according to the second embodiment of the present invention. The control circuit 60b shown in FIG. 8 is applied to the interleaved power supply having the master-slave relationship as shown in FIG. 1.

The control circuit 60b according to the second embodiment of the present invention includes: a master converter including a master switch that performs switching operation; and a slave converter including a slave-switch that performs switching operation while maintaining a predetermined phase difference with respect to the switching operation of the master switch. The control circuit 60b is a control circuit that controls the switching operation of the slave switch used for an interleaved power supply including master and slave converters having the master-slave relationship.

As shown in FIG. 8, the control circuit 60b according to the second embodiment includes: the clock generator 110; a divided signal doubler 200; an edge pulse generator 250; and the slave drive pulse generator 180. Regarding the control circuit 60b according to the second embodiment, the signal doubler 120 and the edge pulse generator 150 which are included in the control circuit 60b of the first embodiment are respectively replaced with the divided signal doubler 200 and the edge pulse generator 250. The clock generator 110 and the slave drive pulse signal generator 180 have similar configurations to those of the first embodiment. For this reason, explanations of configurations and operations of the clock generator 110 and the slave drive pulse signal generator 180 are omitted here.

The divided signal doubler 200 is configured to generate a master switch on-interval pulse signal C indicating information concerning the on-interval of the master switch Q1, based on the master drive pulse signal A that switch-drives the master switch Q1 of the master converter 70 and the clock pulse B. Then, the divided signal doubler 200 is configured to generate n divided signals each having a frequency and a duty ratio which are 1/n times (where n is an integer that is 2 or more) those of the master switch on-interval pulse signal C. Then, the divided signal doubler 200 is configured to generate doubled duty pulse signals D1 and D2 each having a duty that is double that of each of the divided signals.

The divided signal doubler 200 includes, for example: a master switch on-interval pulse generation circuit 130; a divider circuit 220; and a doubled duty pulse signal generation circuit 240. The master switch on-interval generation circuit 130 in the divided signal doubler 200 can be easily designed if constituted by, for example, a D flip-flop 131. A configuration is made such that a master drive pulse signal A is input to a first input terminal D of the D flip-flop 131, and a clock pulse B generated by the clock generator 110 is input to a second input terminal CLK. Additionally, an output terminal Q of the D flip-flop 131 is coupled to the divider circuit 220.

The divider circuit 220 includes, for example: a D flip-flop 221; an AND circuit 222; and an AND circuit 223. A configuration is made such that an inverted signal of the output of an output terminal Q of the D flip-flop 221 is input to a first input terminal D of the D flip-flop 221.

A configuration is made such that the output terminal Q of the D flip-flop 221 and the master switch on-interval pulse signal C are input to an input terminal of the AND circuit 222, an output of the AND circuit 222 is coupled to the doubled duty signal generator 240, and a first divided pulse signal I1 is output from the output terminal of the AND circuit 222. A configuration is made such that the inverted signal of the output of the output terminal Q of the D flip-flop 221 and the master switch on-interval pulse signal C are input to an input terminal of the AND circuit 223, an output of the AND circuit 223 is coupled to the doubled duty signal generation circuit 240, and a second divided pulse signal I2 is output from the output terminal of the AND circuit 223.

The doubled duty pulse signal generation circuit 240 includes, for example: a first up-down counter 241; a second up-down counter 243; an OR circuit 242; and an OR circuit 244. A configuration is made such that the first divided pulse signal I1 generated by the divider circuit 220 is input to a first input terminal UP/DOWN of the up-down counter 241, and the clock pulse B generated by the clock generator 110 is input to a second input terminal CLK of the up-down counter 241.

Further, a counter output Q of the up-down counter 241 is coupled to an input of the OR circuit 242. An output of the OR circuit 242 is coupled to a second edge pulse signal generation circuit 270 in the edge pulse generator 250. A configuration is made such that the second divided pulse signal I2 generated by the divider circuit 220 is input to a first input terminal UP/DOWN of the up-down counter 243, and the clock pulse B generated by the clock generator 110 is input to a second input terminal CLK of the up-down counter 243.

Additionally, a counter output Q of the up-down counter 243 is coupled to an input of the OR circuit 244. An output of the OR circuit 244 is coupled to a third edge pulse signal generation circuit 280 in the edge pulse generator 250. The up-down counters 241 and 243 are configured to generate a first doubled duty pulse signal D1 and a second doubled duty pulse signal D2 which respectively have time intervals double those of the first divided pulse signal I1 and the second divided pulse signal I2, based on the input divided pulse signals I1 and I2 and the input clock pulse B.

Similar to the edge pulse generator 150 in the control circuit 60b according to the first embodiment of the present invention, the edge pulse generator 250 is configured to generate a first edge pulse signal E based on the master drive pulse signal A, and generate a second edge pulse signal J based on the doubled duty pulse signal. A configuration is made such that the doubled duty pulse signals are generated by the doubled duty signal generation circuit 240 as the doubled duty pulse signal D1 and the doubled duty pulse signal D2, which are input to the edge pulse generator 250.

The edge pulse generator 250 includes, for example: a first edge pulse signal generation circuit 160; a second edge pulse signal generation circuit 270; a third edge pulse signal generation circuit 280; and an OR circuit 290. A configuration is made such that the doubled duty pulse signal D1 and the doubled duty pulse signal D2 are input to the input terminals of the second edge pulse signal generation circuit 270 and the third edge pulse signal generation circuit 280. Output terminals of the second edge pulse signal generation circuit 270 and the third edge pulse signal generation circuit 280 are coupled to an input of the OR circuit 290.

An output terminal of the OR circuit 290 is coupled to the slave drive pulse generator 180. A configuration is made such that a second edge pulse signal J is output from the output terminal of the OR circuit 290. In other words, the control circuit 60b having the configuration shown in FIG. 8 is configured such that the edge pulse generator 250 is configured to generate the first edge pulse signal E based on the master drive pulse signal A, and further generate the second edge pulse signal J based on the first doubled duty pulse signal D1 and the second doubled duty pulse signal D2.

Figure 10:
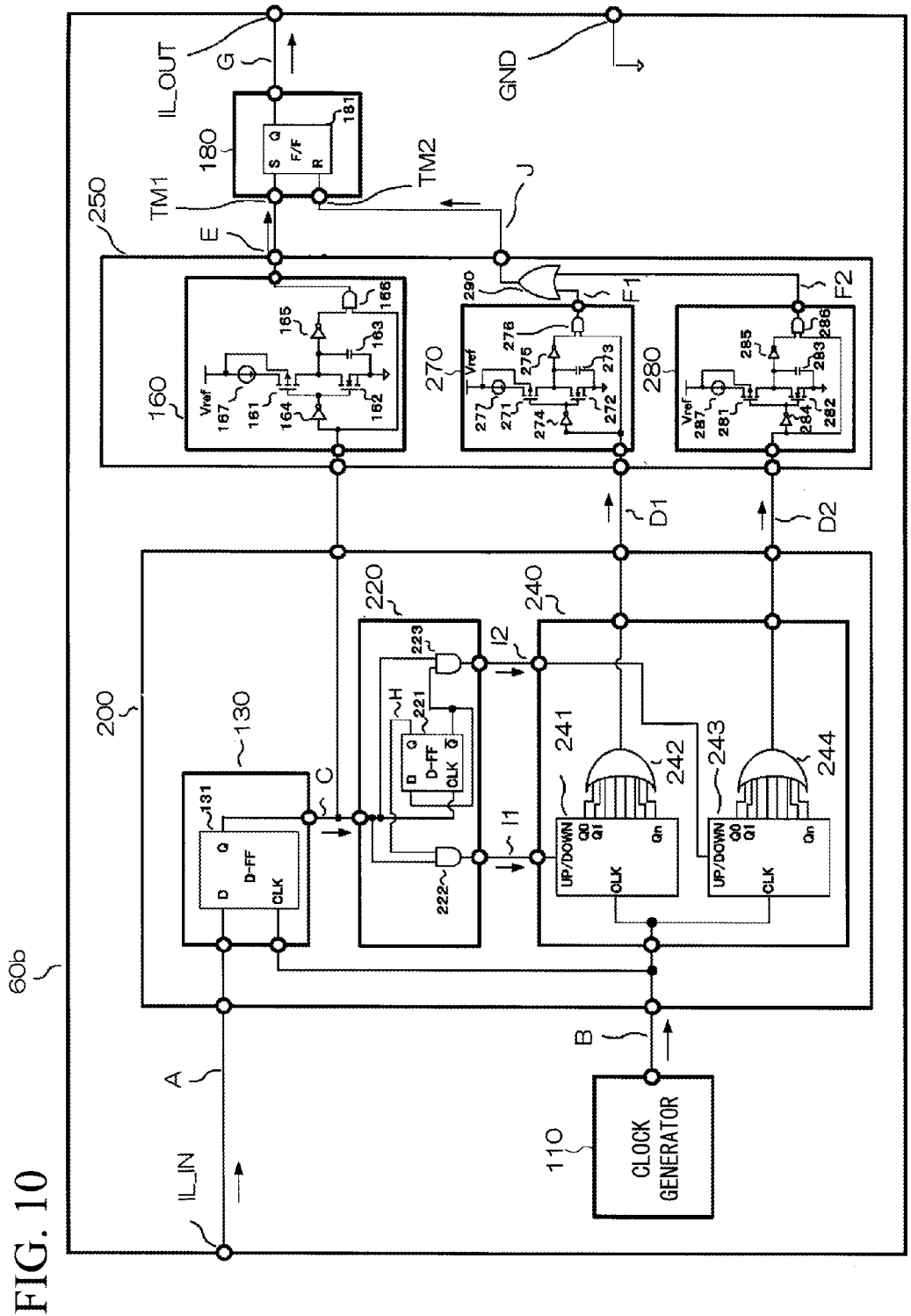
FIG. 10 is a circuit diagram illustrating a modified example of the control circuit 60b shown in FIG. 8.

Here, as explained above, a configuration is made such that the first edge pulse signal E is generated is generated n synchronization with the negative edge timing of the master drive pulse signal A or the timing of the clock pulse B that first occurs after the negative edge timing of the master drive pulse signal A. A configuration may be made as shown in FIG. 8 in order for the first edge pulse signal E to be generated in synchronization with the negative edge timing of the master drive pulse signal A. Additionally, a configuration may be made as shown in FIG. 10 in order for the first edge pulse signal E to be generated in synchronization with the timing of the clock pulse B that first occurs after the negative edge timing of the master drive pulse signal A.

A configuration is made such that the second edge pulse signal J is generated in synchronization with the negative edge timings of the doubled duty pulse signals D1 and D2.

Here, the above clock generator 110, the divided signal doubler 200, the edge pulse generator 250, and the slave drive pulse signal generator 180 respectively correspond to a clock generator, a divided signal doubler, an edge pulse generator, and a slave drive pulse signal generator of the present invention. The above first doubled duty pulse signal D1 and the second doubled duty pulse signal D2 correspond to doubled duty pulse signals of the present invention. Additionally, the above first divided pulse signal I1 and the second divided pulse signal I2 corresponds to divided signals according to the present invention.

Operation of Control Circuit 60b as Second Embodiment

Subsequently, operation of the control circuit 60b as the second embodiment is explained with reference to FIGS. 9 to 11.

Figure 9:
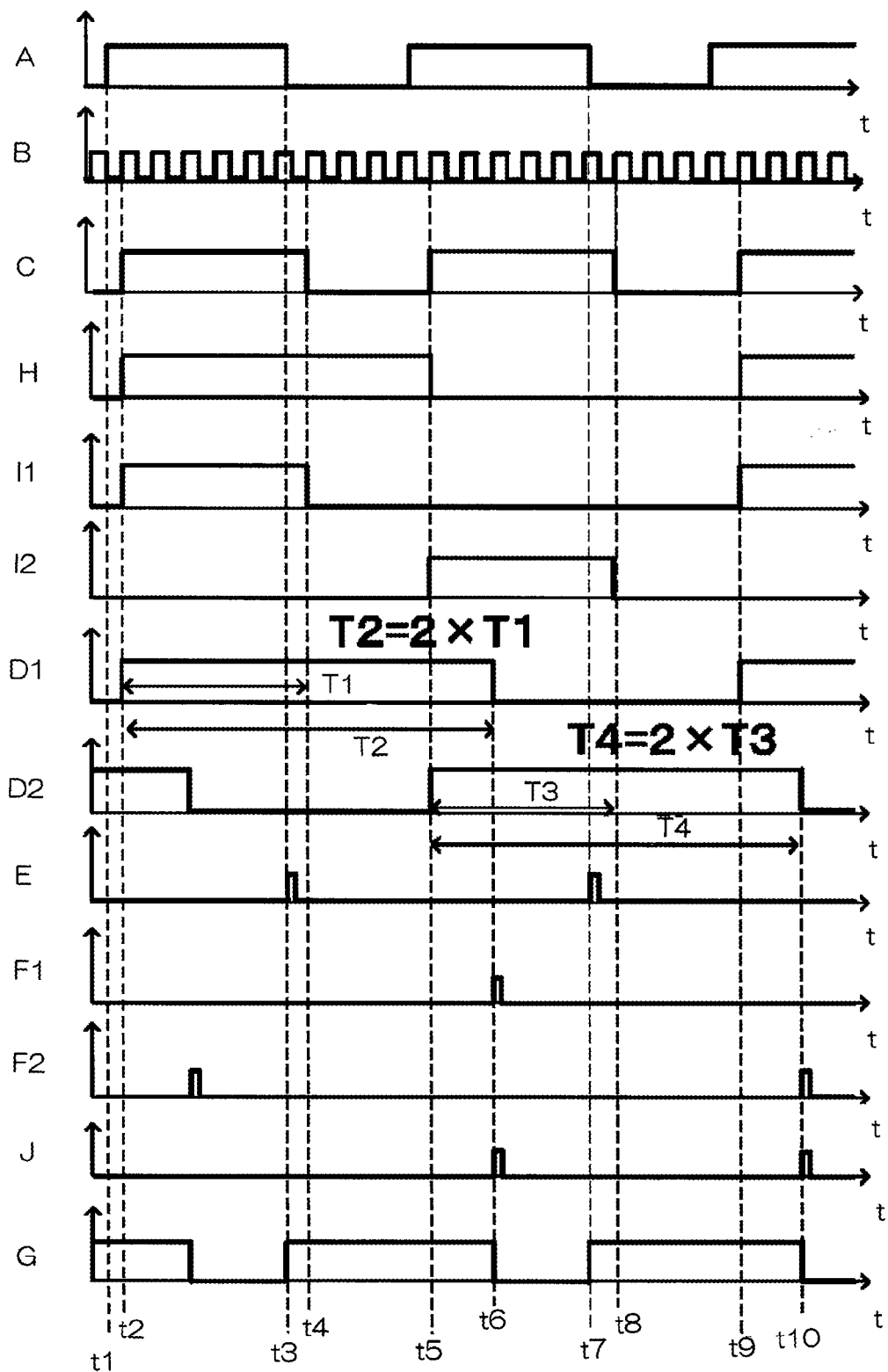
FIG. 9 is a timing chart illustrating operation of the control circuit 60b shown in FIG. 8.

FIG. 9 is a timing chart illustrating the operation of the control circuit 60b as the second embodiment. A, B, C, D1, D2, E, F1, F2, G, H, I1, I2, and J shown in FIG. 9 respectively show voltage waveforms of the master drive pulse signal A, the clock pulse B, the master switch on-interval pulse signal C, the first doubled duty pulse signal D1, the second doubled duty pulse signal D2, the first edge pulse signal E, a signal F1 output from the second edge pulse signal generation circuit 270, a signal F2 output from the third edge pulse signal generation circuit 280, the slave drive pulse signal G, a signal H output from the D flip-flop 221, the first divided pulse signal I1, the second divided pulse signal I2, the second edge pulse signal J.

Figure 11:
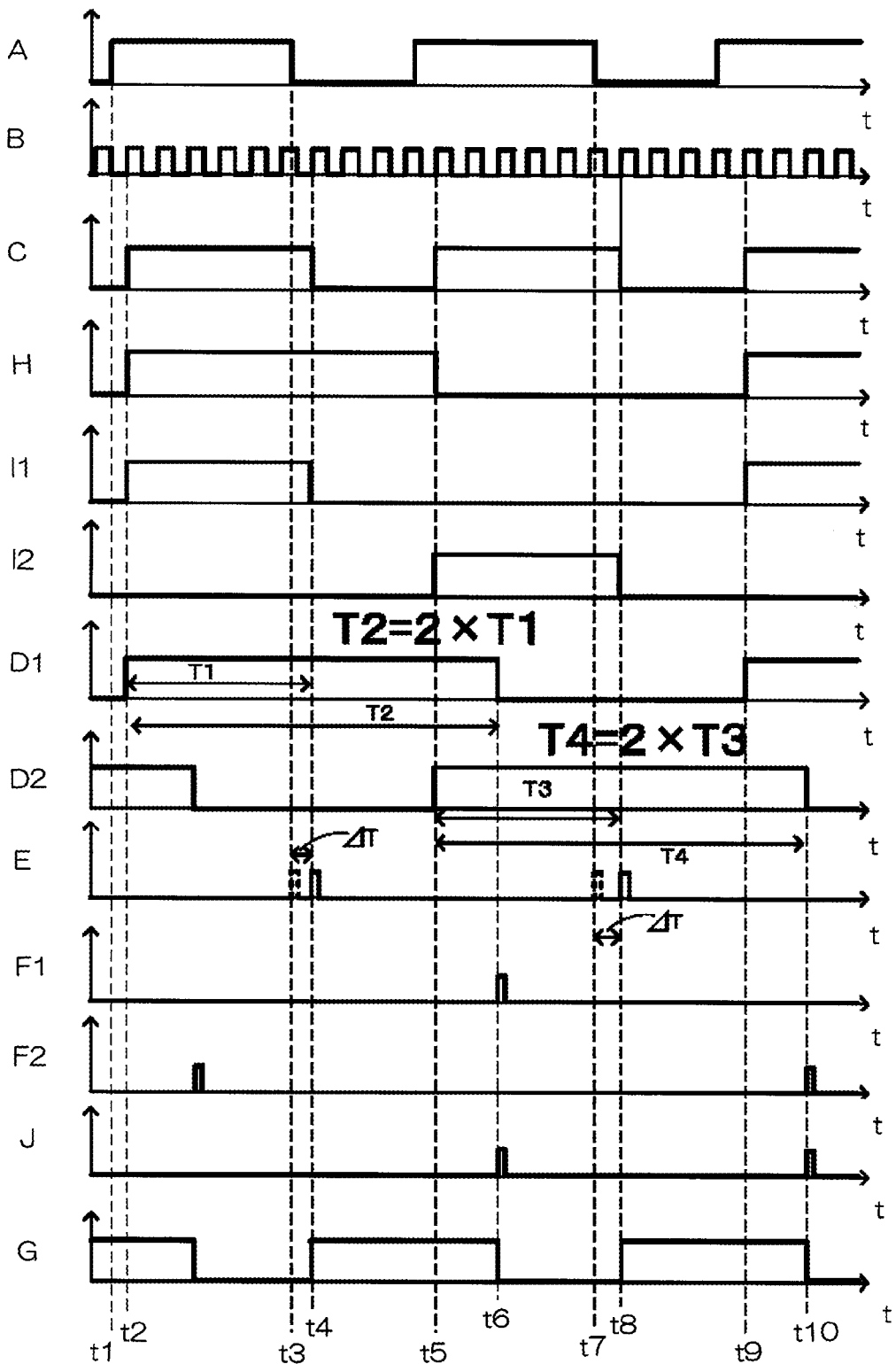
FIG. 11 is a timing chart illustrating operation of the control circuit 60b shown in FIG. 10

FIG. 11 is a timing chart illustrating the operation of the control circuit 60b shown in FIG. 10. A, B, C, D1, D2, E, F1, F2, G, H, I1, I2, and J shown in FIG. 11 respectively show voltage waveforms of the master drive pulse signal A, the clock pulse B, the master switch on-interval pulse signal C, the first doubled duty pulse signal D1, the second doubled duty pulse signal D2, the first edge pulse signal E, the signal F1 output from the second edge pulse signal generation circuit 270, the signal F2 output from the third edge pulse signal generation circuit 280, the slave drive pulse signal G, the signal H output from the D flip-flop 221, the first divided pulse signal I1, the second divided pulse signal I2, and the second edge pulse signal J, which are shown in FIG. 10.

The master drive pulse signal A shown in FIG. 11 is synchronized with a signal that drive-controls the master switch Q1 shown in FIG. 1. Additionally, the clock pulse B shown in FIG. 3 is set to be, for example, a pulse of the frequency of 15 MHz. The master switch on-interval pulse signal C is generated as a signal indicating information concerning the on-interval of the master switch Q1. When the D flip-flop 131 is used as the master switch on-interval pulse generation circuit 130, the D flip-flop 131 is configured such that an input value of the terminal D at the positive edge timing of the clock pulse input to the CLK terminal is output to the terminal Q.

From time t1 to time t4 shown in FIG. 11, for example, the master switch on-interval pulse C changes from LOW to HIGH at the positive edge timing of the clock pulse B (time t2 shown in FIG. 9) that first occurs after the time when the master drive pulse signal A becomes HIGH (time t1 shown in FIG. 9). Then (after time t2 shown in FIG. 9), the master switch on-interval pulse C changes from HIGH to LOW at, for example, the positive edge timing of the clock pulse B (time t4 shown in FIG. 9) that first occurs after the time when the master drive pulse signal A becomes LOW (time t3 shown in FIG. 9).

Thus, the divided signal doubler 200 generates the master switch on-interval pulse signal C indicating information concerning the on-interval of the master switch Q1, based on the master drive pulse signal A and the clock pulse B.

When the divider circuit 220 in the divided signal doubler 200 is constituted by, for example, the D flip-flop 221, the AND circuit 222, and the AND circuit 223, as shown in FIG. 8, the D flip-flop 221 is configured such that an input value HIGH of the terminal D is output to the output terminal Q at the timing at which the input value of the terminal D is HIGH and the input value of the terminal CLK changes from LOW to HIGH (time t2 shown in FIG. 9), and the value of the output Q is maintained until at the timing at which the input value of the terminal CLK is changed from LOW to HIGH again (time t5 shown in FIG. 8) (H shown in FIG. 9).

Additionally, the output Q of the D flip-flop 221 is coupled to one of the input terminals of the AND circuit 222, and an inverted signal of the output Q of the D flip-flop 221 is coupled to one of the input terminals of the AND circuit 223. For this reason, the signals output from the AND circuit 222 and the AND circuit 223 are the first divided pulse signal I1 and the second divided pulse signal I2 into which the pulse as the information concerning the on-interval of the master switch Q1 is alternately sorted.

Accordingly, for example, the HIGH pulse of the master switch on-interval pulse signal C from time t2 to time t4 is synchronized with the HIGH pulse of the first divided pulse signal I1 from time t2 to time t4, and is output as the first divided pulse signal I1. The HIGH pulse of the master switch on-interval pulse signal C from time t5 to time t8 is synchronized with the HIGH pulse of the second divided pulse signal I2 from time t5 to time t8, and is output as the second divided pulse signal I2.

When the duty pulse signal generation circuit 240 in the divided signal doubler 200 is constituted by, for example, the first up-down counter 241, the second up-down counter 243, the OR circuit 242, and the OR circuit 244, as shown in FIG. 8, the first up-down counter 241 is configured such that signals are output from terminals Q0, Q1, Q2, Q3, . . . , Qn associated with the respective pulses input to the terminal CLK, and input to the OR circuit 242 in the interval in which an input value of the terminal UP/DOWN is HIGH (from time t2 to time t4 shown in FIG. 9), and thus the clock pulse B is counted up. For this reason, the first doubled duty pulse signal D1 is HIGH in the interval in which the input value of the terminal UP/DOWN is HIGH (from time t2 to time t4 shown in FIG. 8).

Then, after the time at which the input value of the terminal UP/DOWN changes from HIGH to LOW (time t4 shown in FIG. 9), the first up-down counter 241 counts down the clock pulse B by the same count number as the count number by which the clock pulse B has been counted up in the interval in which the input value of the terminal UP/DOWN is HIGH (from time t2 to time t4 shown in FIG. 9). For this reason, the first doubled duty pulse signal D1 is HIGH in the same interval (interval T1 shown in FIG. 9) as the interval in which the input value of the terminal UP/DOWN is HIGH (from time t2 to time t4 shown in FIG. 9). Consequently, the first doubled duty pulse signal D1 is a HIGH signal having the time interval (interval T2 shown in FIG. 9) that is double that of the first divided pulse signal I1 (interval T1 shown in FIG. 9).

Operations of the second up-down counter 243 and the OR circuit 244 are similar to those of the first up-down counter 241 and the OR circuit 242. The OR circuit 244 outputs the second doubled duty pulse signal D2 having the time interval (interval T4 shown in FIG. 9) that is double that of the second divided pulse signal I2 (interval T3 shown in FIG. 9) input to the terminal UP/DOWN.

Thus, the divided signal doubler 200 generates the n divided signals (the first divided pulse signal I1 and the second divided pulse signal I2) each having the frequency and the duty ratio which are 1/n times (for example, n=2) those of the master switch on-interval pulse signal C, and generates the doubled duty pulse signals D1 and D2 each having the duty that is double that of each of the divided signals.

The edge pulse generator 250 shown in FIG. 8 generates the first edge pulse signal E based on the master drive pulse signal A, and generates the second edge pulse signal J based on the first doubled duty pulse signal D1 and the second doubled duty pulse signal D2. The edge pulse generator 250 shown in FIG. 10 generates the first edge pulse signal E based on the master switch on-interval pulse C, and generates the second edge pulse signal J based on the first doubled duty pulse signal D1 and the second doubled duty pulse signal D2.

In the case of the configuration shown in FIG. 8, the first edge pulse signal E is generated in synchronization with the negative edge timing of the master drive pulse signal A (time t3 shown in FIG. 9). Additionally, in the case of the configuration shown in FIG. 10, the first edge pulse signal E is generated in synchronization with the timing of the clock pulse B (time t4 shown in FIG. 11) that first occurs after the negative edge timing of the master drive pulse signal A (time t3 shown in FIG. 11).

The second edge pulse signal J is generated in synchronization with the negative edge timings of the first doubled duty pulse signal D1 and the first doubled duty pulse signal D2 (time t6 and time t10 shown in FIG. 8).

The slave drive pulse signal generator 180 generates the slave drive pulse signal G based on the first edge pulse signal E and the second edge pulse signal J. In the case of the configuration shown in FIG. 8, the slave drive pulse signal G is a HIGH level signal having a start point at the timing at which the first edge pulse signal E occurs (time t3 shown in FIG. 9) and an end point at the timing at which the second edge pulse signal J occurs (time t6 shown in FIG. 9). Additionally, in the case of the configuration shown in FIG. 11, the slave drive pulse signal G is a HIGH level signal having a start point at the timing at which the first edge pulse signal E occurs (time t4 shown in FIG. 11) and an end point at the timing at which the second edge pulse signal J occurs (time t6 shown in FIG. 11).

Here, in the control circuit 60b shown in FIG. 10, the end point of the master switch on-interval pulse signal C (time t4 shown in FIG. 11) is synchronized with the timing of the clock pulse B. For this reason, it is possible to generate the slave drive pulse signal G more accurately than in the case of using the method of generating the first edge pulse E in synchronization with the negative edge timing of the master drive pulse signal A (time t3 shown in FIG. 11). Specifically, it is possible to make the master drive pulse signal A approximate the slave drive pulse signal G by the interval ΔT shown in FIG. 11.

As explained above, according to the second embodiment, the clock generator 110 generates the clock pulse B having a predetermined frequency. Additionally, the divided signal doubler 200 generates the master switch on-interval pulse signal C indicating the information concerning the on-interval of the master switch Q1, based on the master drive pulse signal A that switch-drives the master switch Q1 of the master converter 70 and the clock pulse B. Thus, the divided signal doubler 200 generates the n divided signals (the first divided pulse signal I1 and the second divided pulse signal I2) each having the frequency and the duty ratio which are 1/n times (for example, n=2) those of the master switch on-interval pulse signal C, and generates the doubled duty pulse signals (the first doubled duty pulse signal D1 and the second doubled duty pulse signal D2) each having the duty that is double that of each of the divided signals. Further, the edge pulse generator 250 generates the first edge pulse signal E based on the master drive pulse signal A, and generates the second edge pulse signal J based on the doubled duty pulse signals. Based on the first edge pulse signal E and the second edge pulse signal J, the slave drive pulse signal generator 180 generates the slave drive pulse signal G that switch-drives the slave switch Q2 so that the on-interval of the slave switch is identical to the on-interval of the master switch. For this reason, it is possible to make the on-intervals of the switching currents of the master converter 70 and the slave converter 80 substantially identical to each other even when the duty of the switching operation of the master converter 70 varies. Thus, it is possible to easily achieve the interleaved power supply that is unlikely to be affected by a variation among components and are suitable for mass production.

Additionally, according to the second embodiment, the first edge pulse signal E is generated in synchronization with the negative edge timing of the master drive pulse signal A or the timing of the clock pulse B that first occurs after the negative edge timing of the master drive pulse signal A. Accordingly, it is possible to accurately and reliably make the on-intervals of the switching currents of the master converter 70 and the slave converter 80 substantially identical to each other even when the duty of the switching operation of the master converter 70 varies. Particularly, the method of generating the first edge pulse signal E in synchronization with the timing of the clock pulse B that first occurs after the negative edge timing of the master drive pulse signal A is a method such that the end point of the master drive pulse signal A is synchronized with the timing of the clock pulse. For this reason, it is possible to generate the slave switching drive pulse signal G more accurately than in the case of using the method of generating the first edge pulse signal E in synchronization with the negative edge timing of the master drive pulse signal A.

Further, according to the second embodiment, the second edge pulse signal J is generated in synchronization with the negative edge timings of the doubled duty pulse signals D1 and D2. Accordingly, it is possible to make the on-intervals of the switching currents of the master converter 70 and the slave converter 80 substantially identical to each other even when the duty of the switching operation of the master converter 70 varies.

Although embodiments of the present invention have been explained above, the present invention is not limited to the above embodiments, and various modifications and applications may be made without departing from the scope of the present invention.

DESCRIPTION OF REFERENCE NUMERALS

1: interleaved power supply
10: rectifier circuit
20: transformer
60a, 60b, 60c: control circuit
70: master converter
80: slave converter
110: clock generator
120: signal doubler
130: master switch on-interval pulse generation circuit
140: doubled duty pulse signal generator
150: edge pulse generator
160: first edge pulse signal generation circuit
170: second edge pulse signal generation circuit
180: slave drive pulse signal generator
200: divided signal doubler
220: divider circuit
240: doubled duty pulse signal generation circuit
250: edge pulse generator

The invention claimed is:

1. A control circuit for an interleaved power supply, the interleaved power supply comprising: a master converter including a master switch configured to perform switching operation; and a slave converter including a slave switch configured to perform switching operation while maintaining a predetermined phase difference with respect to the switching operation of the master switch, the master converter and the slave converter having a master-slave relationship, the control circuit being configured to control the switching operation of the slave switch, the control circuit comprising:
 a clock generator configured to generate a clock pulse having a predetermined frequency;
 a signal doubler configured to generate a master switch on-interval pulse signal indicating information concerning an on-interval of the master switch based on the clock pulse and a master drive pulse signal that switch-drives the master switch of the master converter, and generate a doubled duty pulse signal having a duty that is double that of the master switch on-interval pulse signal;
 an edge pulse generator configured to generate a first edge pulse signal based on the master drive pulse signal, and generate a second edge pulse signal based on the doubled duty pulse signal; and
 a slave drive pulse signal generator configured to generate, based on the first edge pulse signal and the second edge pulse signal, a slave drive pulse signal that switch-drives the slave switch so that an on-interval of the slave switch is identical to an on-interval of the master switch.

2. The control circuit according to claim 1, wherein the first edge pulse signal is generated in synchronization with a negative edge timing of the master drive pulse signal or a timing of the first clock pulse after the negative edge timing of the master drive pulse signal.

3. The control circuit according to claim 1, wherein the second edge pulse signal is generated in synchronization with a negative edge timing of the doubled duty pulse signal.

4. An interleaved power supply comprising:
 a control circuit;
 a master converter including a master switch configured to perform switching operation; and
 a slave converter including a slave switch configured to perform switching operation while maintaining a predetermined phase difference with respect to the switching operation of the master switch,
 the master converter and the slave converter have a master-slave relationship, and
 the control circuit comprises:
 a clock generator configured to generate a clock pulse having a predetermined frequency;
 a signal doubler configured to generate a master switch on-interval pulse signal indicating information concerning an on-interval of the master switch based on the clock pulse and a master drive pulse signal that switch-drives the master switch of the master converter, and generate a doubled duty pulse signal having a duty that is double that of the master switch on-interval pulse signal;
 an edge pulse generator configured to generate a first edge pulse signal based on the master drive pulse signal, and generate a second edge pulse signal based on the doubled duty pulse signal; and
 a slave drive pulse signal generator configured to generate, based on the first edge pulse signal and the second edge pulse signal, a slave drive pulse signal that switch-drives the slave switch so that an on-interval of the slave switch is identical to an on-interval of the master switch.

5. A control circuit for an interleaved power supply, the interleaved power supply comprising: a master converter including a master switch configured to perform switching operation; and a slave converter including a slave switch configured to perform switching operation while maintaining a predetermined phase difference with respect to the switching operation of the master switch, the master converter and the slave converter having a master-slave relationship, the control circuit being configured to control the switching operation of the slave switch, the control circuit comprising:
- a clock generator configured to generate a clock pulse having a predetermined frequency;
- a divided signal doubler configured to: generate a master switch on-interval pulse signal indicating information concerning an on-interval of the master switch based on the clock pulse and a master drive pulse signal that switch-drives the master switch of the master converter; generate n divided signals each having a frequency and a duty ratio that are 1/n times those of the master switch on-interval pulse signal (where n is an integer that is 2 or more), and generate doubled duty pulse signals each having a duty that is double that of each of the divided signals;
- an edge pulse generator configured to generate a first edge pulse signal based on the master drive pulse signal, and generate a second edge pulse signal based on the doubled duty pulse signals; and
- a slave drive pulse signal generator configured to generate, based on the first edge pulse signal and the second edge pulse signal, a slave drive pulse signal that switch-drives the slave switch so that an on-interval of the slave switch is identical to an on-interval of the master switch.

6. The control circuit according to claim 5, wherein the first edge pulse signal is generated in synchronization with an negative edge timing of the master drive pulse signal or a timing of the first clock pulse after the negative edge timing of the master drive pulse signal.

7. The control circuit according to claim 5, wherein the second edge pulse signal is generated in synchronization with negative edge timings of the doubled duty pulse signals.

8. An interleaved power supply comprising:
a control circuit;
a master converter including a master switch configured to perform switching operation; and
a slave converter including a slave switch configured to perform switching operation while maintaining a predetermined phase difference with respect to the switching operation of the master switch,
wherein the master converter and the slave converter have a master-slave relationship, and
the control circuit comprises:
a clock generator configured to generate a clock pulse having a predetermined frequency;
a divided signal doubler configured to: generate a master switch on-interval pulse signal indicating information concerning an on-interval of the master switch based on the clock pulse and a master drive pulse signal that switch-drives the master switch of the master converter; generate n divided signals each having a frequency and a duty ratio that are 1/n times those of the master switch on-interval pulse signal (where n is an integer that is 2 or more), and generate doubled duty pulse signals each having a duty that is double that of each of the divided signals;
an edge pulse generator configured to generate a first edge pulse signal based on the master drive pulse signal, and generate a second edge pulse signal based on the doubled duty pulse signals; and
a slave drive pulse signal generator configured to generate, based on the first edge pulse signal and the second edge pulse signal, a slave drive pulse signal that switch-drives the slave switch so that an on-interval of the slave switch is identical to an on-interval of the master switch.

\* \* \* \* \*